US012560879B2

(12) United States Patent
Matsuda et al.

(10) Patent No.: US 12,560,879 B2
(45) Date of Patent: Feb. 24, 2026

(54) IMAGE FORMING APPARATUS

(71) Applicants: Ryohei Matsuda, Kanagawa (JP); Yoshiki Yamaguchi, Kanagawa (JP); Takashi Seto, Kanagawa (JP); Hiroshi Yoshinaga, Chiba (JP); Ryohhei Sugiyama, Kanagawa (JP)

(72) Inventors: Ryohei Matsuda, Kanagawa (JP); Yoshiki Yamaguchi, Kanagawa (JP); Takashi Seto, Kanagawa (JP); Hiroshi Yoshinaga, Chiba (JP); Ryohhei Sugiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/661,725

(22) Filed: May 13, 2024

(65) Prior Publication Data

US 2024/0385554 A1 Nov. 21, 2024

(30) Foreign Application Priority Data

May 15, 2023 (JP) ................................ 2023-080102

(51) Int. Cl.
*G03G 15/20* (2006.01)
*G03G 15/00* (2006.01)

(52) U.S. Cl.
CPC ..... *G03G 15/2028* (2013.01); *G03G 15/2064* (2013.01); *G03G 15/50* (2013.01)

(58) Field of Classification Search
None
See application file for complete search history.

(56) References Cited

U.S. PATENT DOCUMENTS 10,809,653 B1 * 10/2020 Ohara ................ G03G 15/2007
2005/0169656 A1 * 8/2005 Nihonyanagi ..... G03G 15/2025 399/327

(Continued)

FOREIGN PATENT DOCUMENTS

JP 2008-275756 A 11/2008
JP 2010-282054 A 12/2010

(Continued)

OTHER PUBLICATIONS

Machine translations of JP 2015-138113 (IDS); JP 2018-004922 (IDS); JP 2010-282054 (IDS); and, JP 2008-275756 (IDS).*
Machine translation of Arai, JP 2016-176993.*

*Primary Examiner* — Sevan A Aydin
(74) *Attorney, Agent, or Firm* — XSENSUS LLP

(57) ABSTRACT

An image forming apparatus includes a heating device, a motor, and circuitry. The heating device includes a belt, a heater, belt holders, a slide aid, lubricant, and a temperature sensor. The heater heats the belt. The belt holders hold both ends of the belt in a longitudinal direction of the belt. The inner circumferential surface of the belt slides on the slide aid. The lubricant is adhered to the belt. The temperature sensor detects a temperature of the belt. The motor rotates the belt in a forward direction to convey a recording medium and a reverse direction opposite to the forward direction. The circuitry is configured to control the motor to rotate the belt in the reverse direction in response to a detection of the temperature equal to or higher than 50° C. by the temperature sensor.

18 Claims, 12 Drawing Sheets

(56) References Cited

U.S. PATENT DOCUMENTS

| | | | | |
|---|---|---|---|---|
| 2006/0018679 | A1* | 1/2006 | Ishino | G03G 21/206 399/94 |
| 2008/0118262 | A1* | 5/2008 | Kinouchi | G03G 15/2039 399/69 |
| 2009/0052958 | A1* | 2/2009 | Okuno | G03G 15/206 399/329 |
| 2009/0080954 | A1* | 3/2009 | Miyata | G03G 15/2064 399/329 |
| 2009/0245843 | A1* | 10/2009 | Sato | G03G 15/2039 399/329 |
| 2011/0222875 | A1* | 9/2011 | Imada | G03G 15/2025 399/33 |
| 2016/0274516 | A1 | 9/2016 | Yamaguchi et al. | |
| 2016/0378033 | A1 | 12/2016 | Ishigaya et al. | |
| 2017/0010571 | A1 | 1/2017 | Matsuda et al. | |
| 2017/0017182 | A1 | 1/2017 | Saito et al. | |
| 2017/0205742 | A1 | 7/2017 | Shoji et al. | |
| 2017/0255147 | A1 | 9/2017 | Seki et al. | |
| 2017/0261900 | A1 | 9/2017 | Sawada et al. | |
| 2017/0285537 | A1* | 10/2017 | Onaka | G03G 15/206 |
| 2018/0011432 | A1 | 1/2018 | Yoshinaga et al. | |
| 2018/0157198 | A1 | 6/2018 | Seto et al. | |
| 2018/0284663 | A1 | 10/2018 | Matsuda et al. | |
| 2018/0335733 | A1 | 11/2018 | Matsuda et al. | |
| 2018/0348680 | A1 | 12/2018 | Fujimoto et al. | |
| 2018/0356754 | A1 | 12/2018 | Yoshinaga et al. | |
| 2019/0243291 | A1 | 8/2019 | Matsuda et al. | |
| 2020/0233343 | A1* | 7/2020 | Hisada | G03G 15/205 |
| 2020/0285180 | A1 | 9/2020 | Matsuda et al. | |
| 2020/0401068 | A1 | 12/2020 | Matsuda et al. | |
| 2021/0041818 | A1 | 2/2021 | Matsuda | |
| 2022/0171315 | A1 | 6/2022 | Matsuda et al. | |
| 2023/0280682 | A1 | 9/2023 | Ryohei et al. | |

FOREIGN PATENT DOCUMENTS

| | | | | |
|---|---|---|---|---|
| JP | 2015-138113 | A | 7/2015 | |
| JP | 2016176993 | A * | 10/2016 | G03G 15/2053 |
| JP | 2018-004922 | A | 1/2018 | |
| JP | 2018-013647 | A | 1/2018 | |
| JP | 2019-007989 | A | 1/2019 | |

* cited by examiner

IMAGE FORMING APPARATUS

CROSS-REFERENCE TO RELATED APPLICATION

This patent application is based on and claims priority pursuant to 35 U.S.C. § 119 (a) to Japanese Patent Application No. 2023-080102, filed on May 15, 2023, in the Japan Patent Office, the entire disclosure of which is hereby incorporated by reference herein.

BACKGROUND

Technical Field

Embodiments of the present disclosure relate to an image forming apparatus.

Related Art

One type of image forming apparatus such as a copier or a printer includes a fixing device that is a heating device heating a recording medium such as a sheet bearing an unfixed image to fix the unfixed image onto the recording medium.

In such a fixing device, a liquid or semi-solid substance having lubricity, which may be referred to as lubricant in the following description, such as oil or grease is typically used to reduce sliding friction generated between a belt such as a fixing belt and a component such as a belt holder and a slide member over which the belt slides. In order to reduce the sliding friction of the belt, it is necessary to appropriately hold lubricant between the belt and the slide member or the belt holder. The substance having lubricity refers to a substance that is interposed between components to reduce frictional resistance between the components.

SUMMARY

This specification describes an improved image forming apparatus that includes a heating device, a motor, and circuitry. The heating device includes a belt, a heater, belt holders, a slide aid, lubricant, and a temperature sensor. The heater heats the belt. The belt holders hold both ends of the belt in a longitudinal direction of the belt. The inner circumferential surface of the belt slides on the slide aid. The lubricant is adhered to the belt. The temperature sensor detects a temperature of the belt. The motor rotates the belt in a forward direction to convey a recording medium and a reverse direction opposite to the forward direction. The circuitry is configured to control the motor to rotate the belt in the reverse direction in response to a detection of the temperature equal to or higher than 50° C. by the temperature sensor.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
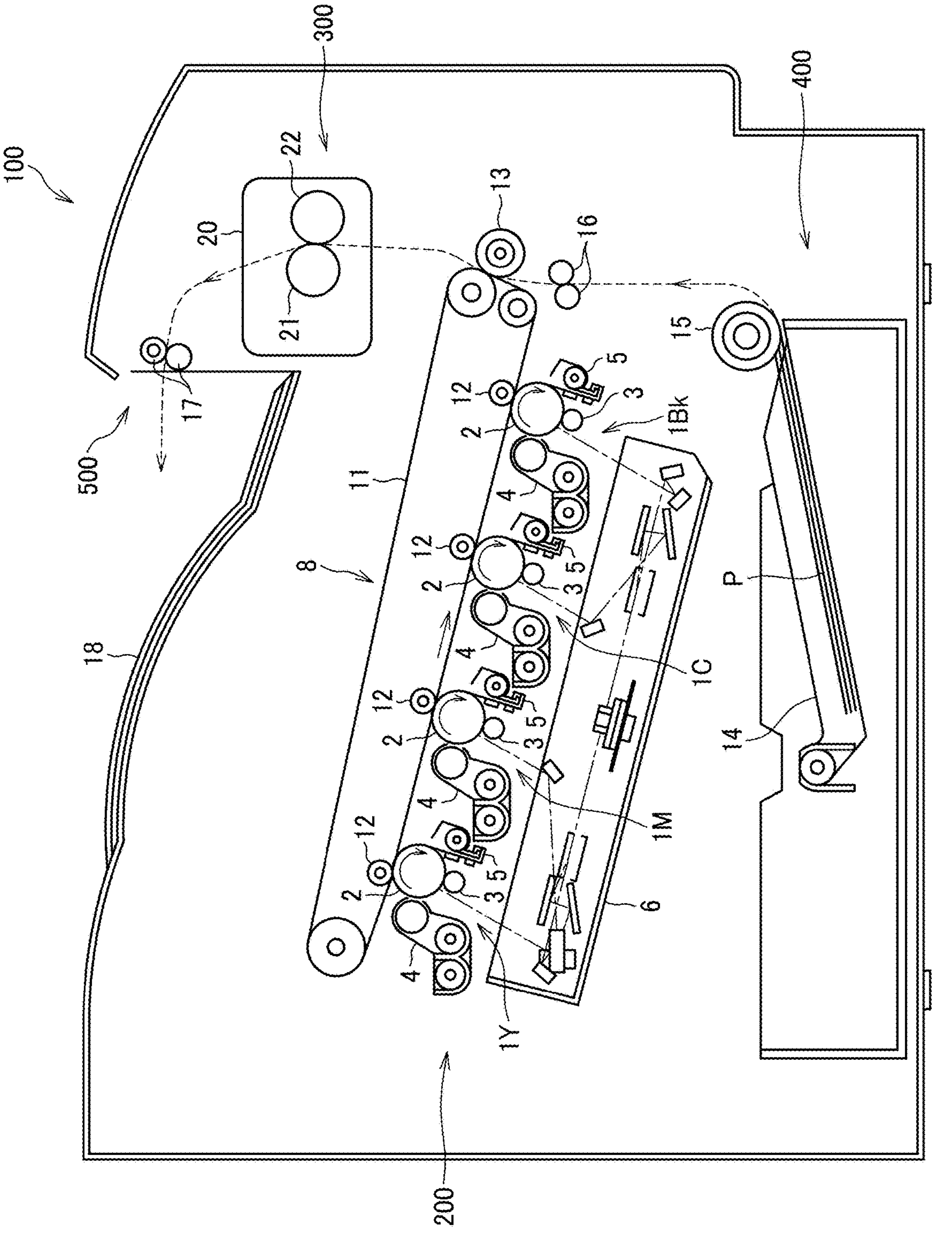
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a," "an," and "the" are intended to include the plural forms as well, unless the context clearly indicates otherwise.

With reference to drawings, descriptions are given below of embodiments of the present disclosure. In the drawings for illustrating embodiments of the present disclosure, elements or components identical or similar in function or shape are given identical reference numerals as far as distinguishable, and redundant descriptions are omitted.

FIG. 1 is a schematic diagram of a configuration of an image forming apparatus 100 according to an embodiment of the present disclosure. In the following description, the "image forming apparatus" includes a printer, a copier, a facsimile machine, or a multifunction peripheral having at least two of printing, copying, scanning, and facsimile functions. "Image formation" means the formation of images with meanings such as characters and figures and the formation of images with no meanings such as patterns. Initially, with reference to FIG. 1, a description is given of an overall configuration and operation of the image forming apparatus 100 according to the embodiment of the present disclosure.

As illustrated in FIG. 1, the image forming apparatus 100 according to the present embodiment includes an image forming section 200 to form an image on a sheet-shaped recording medium such as a sheet, a fixing section 300 to fix the image onto the recording medium, a recording medium feeder 400 to feed the recording medium to the image forming section 200, and a recording medium ejection section 500 to eject the recording medium to an outside of the image forming apparatus 100.

The image forming section 200 includes four process units 1Y, 1M, 1C, and 1Bk as image forming units, an exposure device 6 to form an electrostatic latent image on a photoconductor 2 in each of the process units 1Y, 1M, 1C, and 1Bk, and a transfer device 8 to transfer an image onto the recording medium.

The process units 1Y, 1M, 1C, and 1Bk have the same configuration except for containing different color toners (developers), i.e., yellow (Y), magenta (M), cyan (C), and black (Bk) toners, respectively, corresponding to decomposed color separation components of full-color images. Specifically, each of the process units 1Y, 1M, 1C, and 1Bk includes the photoconductor 2 serving as an image bearer bearing the image on the surface of the image bearer, a charger 3 to charge the surface of the photoconductor 2, a developing device 4 to supply the toner as the developer to the surface of the photoconductor 2 to form a toner image, and a cleaner 5 to clean the surface of the photoconductor 2.

The transfer device 8 includes an intermediate transfer belt 11, primary transfer rollers 12, and a secondary transfer roller 13. The intermediate transfer belt 11 is an endless belt stretched by a plurality of support rollers. Four primary transfer rollers 12 are disposed inside the loop of the intermediate transfer belt 11. Each of the primary transfer rollers 12 is in contact with the corresponding photoconductor 2 via the intermediate transfer belt 11 to form a primary transfer nip between the intermediate transfer belt 11 and each photoconductor 2. The secondary transfer roller 13 is in contact with the outer circumferential surface of the intermediate transfer belt 11 to form a secondary transfer nip.

The fixing section 300 includes a fixing device 20 as a heating device that heats the recording medium bearing the transferred image. The fixing device 20 includes a fixing belt 21 and a pressure roller 22. The fixing belt 21 heats the image on the recording medium. The pressure roller 22 contacts the fixing belt 21 to form an area of contact, called a fixing nip, between the fixing belt 21 and the pressure roller 22.

The recording medium feeder 400 includes a sheet tray 14 to store sheets P as recording media and a feed roller 15 to feed the sheet P from the sheet tray 14. Although a "recording medium" is described as a "sheet of paper" (referred to simply as "sheet") in the following description, the "recording medium" is not limited to the sheet of paper. Examples of the "recording medium" include not only a sheet of paper but also an overhead projector (OHP) transparency sheet, a fabric, a metallic sheet, a plastic film, and a prepreg sheet including carbon fibers previously impregnated with resin. Examples of the "sheet" include thick paper, a postcard, an envelope, thin paper, coated paper (e.g., coat paper and art paper), and tracing paper, in addition to plain paper.

The recording medium ejection section 500 includes an output roller pair 17 to eject the sheet P to the outside of the image forming apparatus 100 and an output tray 18 to place the sheet P ejected by the output roller pair 17.

To provide a fuller understanding of the embodiments of the present disclosure, a description is now given of printing operations of the image forming apparatus 100 according to the present embodiment, with continued reference to FIG. 1.

When the image forming apparatus 100 starts the printing operations, the photoconductors 2 of the process units 1Y, 1M, 1C, and 1Bk and the intermediate transfer belt 11 of the transfer device 8 start rotating. The feed roller 15 starts rotating to feed the sheet P from the sheet tray 14. The sheet P fed from the sheet tray 14 is brought into contact with a timing roller pair 16 and temporarily stopped until the image forming section 200 forms the image to be transferred to the sheet P.

In each of the process units 1Y, 1M, 1C, and 1Bk, the charger 3 uniformly charges the surface of the photoconductor 2 at a high electric potential. Based on image data of a document read by a document reading device or print data instructed to print by a terminal, the exposure device 6 exposes the charged surface of each of the photoconductors 2. As a result, the electric potential at an exposed portion on the surface of each of the photoconductors 2 is decreased. Thus, an electrostatic latent image is formed on the surface of each of the photoconductors 2. The developing device 4 supplies toner to the electrostatic latent image formed on the photoconductor 2 to form the toner image on the photoconductor 2. The toner images formed on the photoconductors 2 reach the primary transfer nips defined by the primary transfer rollers 12 with the rotation of the photoconductors 2 and are transferred onto the intermediate transfer belt 11 rotated counterclockwise in FIG. 1 successively such that the toner images are superimposed on the intermediate transfer belt 11, forming a full-color toner image thereon. Thus, the full-color toner image is formed on the intermediate transfer belt 11. The image forming apparatus 100 can form a monochrome toner image by using any one of the four process units 1Y, 1M, 1C, and 1Bk, or can form a bicolor toner image or a tricolor toner image by using two or three of the process units 1Y, 1M, 1C, and 1Bk. After the toner image is transferred to the intermediate transfer belt 11, the cleaner 5 removes the residual toner that remains on the photoconductor 2 from the surface of the photoconductor 2.

In accordance with the rotation of the intermediate transfer belt 11, the toner image transferred onto the intermediate transfer belt 11 is conveyed to the secondary transfer nip (the position of the secondary transfer roller 13) and is transferred onto the sheet P conveyed by the timing roller pair 16. The sheet P bearing the toner image is conveyed to the fixing device 20. In the fixing device 20, the fixing belt 21 and the pressure roller 22 apply heat and pressure to the toner image on the sheet P to fix the toner image onto the sheet P. Then, the sheet P bearing the fixed toner image is conveyed to the recording medium ejection section 500. In the recording medium ejection section 500, the output roller pair 17 ejects the sheet P onto the output tray 18. Thus, a series of printing operations is completed.

Figure 2:
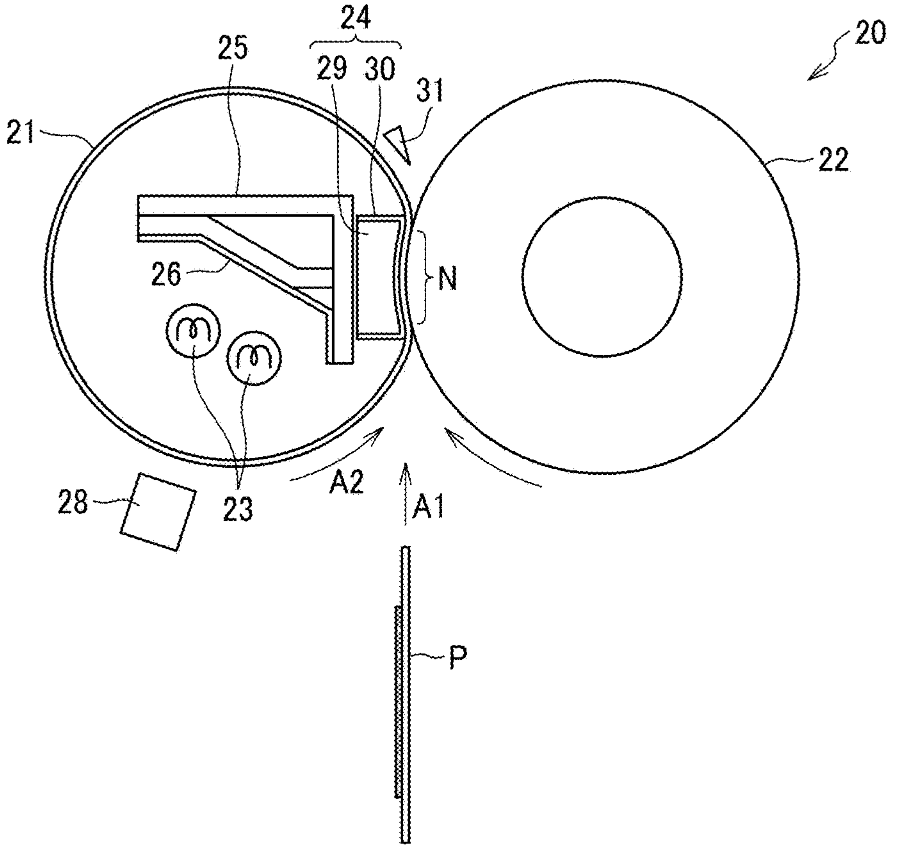
FIG. 2 is a cross-sectional view of a center portion of a fixing device according to an embodiment of the present disclosure.
Figure 3:
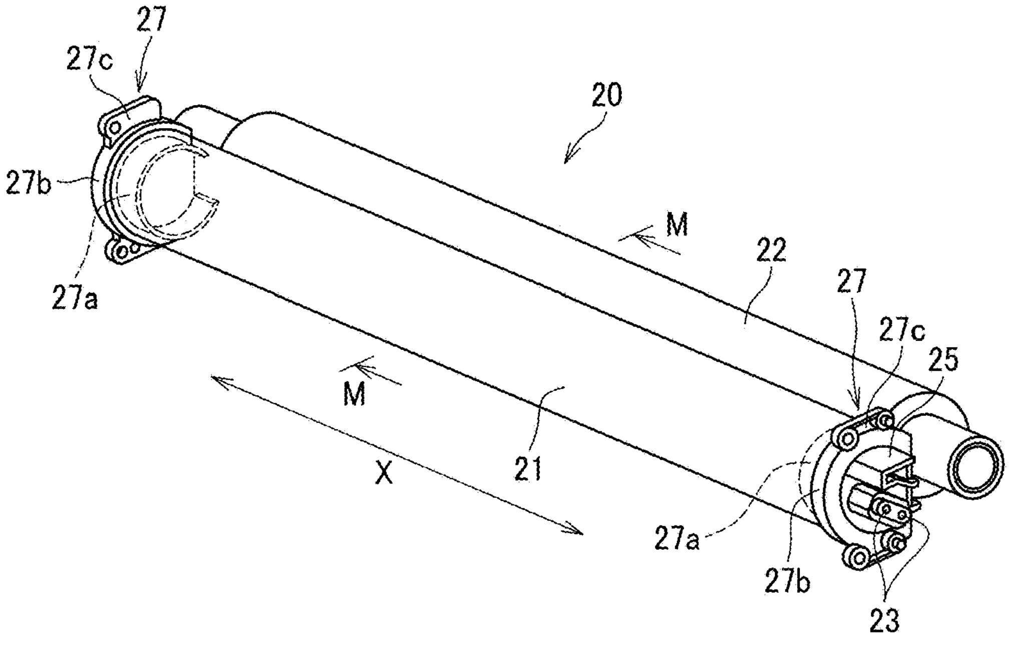
FIG. 3 is a perspective view of the fixing device of FIG. 2.

Referring now to FIGS. 2 and 3, a description is given of a basic configuration of the fixing device 20 according to the present embodiment. FIG. 2 is a cross-sectional view of a center portion of the fixing device 20 according to the present embodiment, taken along a line M-M of FIG. 3 at the center of the fixing belt 21 in the longitudinal direction of the fixing belt 21. The "longitudinal direction" of the fixing belt is a direction indicated by an arrow X in FIG. 3.

As illustrated in FIGS. 2 and 3, the fixing device 20 according to the present embodiment includes heaters 23, a nip formation pad 24, a stay 25, a reflector 26 (see FIG. 2), belt holders 27 (see FIG. 3), a temperature sensor 28 (see FIG. 2), and a separator 31 (see FIG. 2) in addition to the fixing belt 21 and the pressure roller 22 described above. The direction perpendicular to the sheet surface of FIG. 2 is the longitudinal direction of the fixing belt 21, the pressure roller 22, the heater 23, the nip formation pad 24, the stay 25, the reflector 26, and the fixing device 20. This direction is hereinafter simply referred to as the longitudinal direction. The longitudinal direction is also a width direction of the sheet P conveyed, a belt width direction of the fixing belt 21, and an axial direction of the pressure roller 22. A direction indicated by an arrow A1 in FIG. 2 is a sheet conveyance direction as a recording medium conveyance direction, and a direction indicated by an arrow A2 is a forward rotation direction of the fixing belt 21.

The fixing belt 21 is a belt (specifically, a first rotator or a fixing rotator) that contacts a surface of the sheet P bearing unfixed toner to fix the unfixed toner (in other words, an unfixed image) onto the sheet P.

The fixing belt 21 is an endless belt including a base layer, an elastic layer, and a release layer successively layered from the inner circumferential surface to the outer circumferential surface. The base layer has a thickness of from 30 μm to 50 μm and is made of metal, such as nickel or stainless steel, or resin such as polyimide. The elastic layer has a thickness of 100 μm to 300 μm and is made of rubber such as silicone rubber, silicone rubber form, or fluorine rubber. The elastic layer of the fixing belt 21 eliminates slight surface asperities of the fixing belt 21 at the fixing nip, thus facilitating uniform conduction of heat to the toner image on the sheet P. The release layer of the fixing belt 21 has a thickness of 10 μm to 50 μm and is made of, for example, tetrafluoroethylene-perfluoroalkylvinylether copolymer (PFA), polytetrafluoroethylene (PTFE), polyimide, polyetherimide, or polyether sulfide (PES). The release layer of the fixing belt 21 facilitates the separation of toner contained in the toner image on the sheet P from the fixing belt 21. In other words, the release layer of the fixing belt 21 facilitates the release of the toner from the fixing belt 21. To reduce the size and thermal capacity of the fixing belt 21, the fixing belt 21 preferably has a total thickness equal to or less than 1 mm and a loop diameter equal to or less than 30 mm.

The pressure roller 22 is a pressure rotator (specifically, a second rotator or counter rotator) disposed to face the outer circumferential surface of the fixing belt 21.

Specifically, the pressure roller 22 includes a solid iron core, an elastic layer on an outer circumferential surface of the core, and a release layer resting on an outer circumferential surface of the elastic layer. The core may be hollow. The elastic layer is made of, for example, silicone rubber, silicone rubber foam, or fluorine rubber. The release layer is made of fluororesin such as PFA or PTFE.

The heater 23 heats the fixing belt 21. In the present embodiment, a halogen heater is used as the heater 23. Instead of the halogen heater, the heater 23 may be an electromagnetic induction heating system or another radiant heater such as a carbon heater or a ceramic heater. In the present embodiment, the two heaters 23 are disposed inside the loop formed by the fixing belt 21. However, the number of the heaters 23 is not limited to two. Alternatively, a single heater 23 may be disposed. Alternatively, three or more heaters 23 may be disposed.

The nip formation pad 24 is disposed inside the loop of the fixing belt 21. The nip formation pad 24 forms a fixing nip N between the fixing belt 21 and the pressure roller 22 under pressure from the pressure roller 22. The nip formation pad 24 includes a base pad 29 and a slide aid sheet 30 as a slide aid.

The base pad 29 is continuously disposed in the longitudinal direction X of the fixing belt 21 and fixed to the stay 25. The shape of the fixing nip N is determined by the base pad 29 under pressure from the pressure roller 22. The base pad 29 is preferably made of a heat-resistant material having a heat-resistant temperature of not less than 200° C. For example, the base pad 29 is made of a typical heat-resistant resin such as polyether sulfone (PES), polyphenylene sulfide (PPS), liquid crystal polymer (LCP), polyether nitrile (PEN), polyamide-imide (PAI), or polyether ether ketone (PEEK). The base pad 29 made of such a heat-resistant material prevents the thermal deformation of the base pad 29 in a fixing temperature range and stabilizes the shape of the fixing nip N. Although FIG. 2 illustrates the fixing nip N having a concave shape, the fixing nip N may be flat or have another shape.

The slide aid sheet 30 is a low-friction sheet interposed between the base pad 29 and the inner circumferential surface of the fixing belt 21. The slide aid sheet 30 interposed between the base pad 29 and the fixing belt 21 reduces the sliding friction of the fixing belt 21 with respect to the base pad 29. The slide aid sheet 30 is made of a material having excellent heat resistance and slidability, such as PTFE or PFA. The base pad 29 itself made of a low-friction material enables a configuration not including the slide aid sheet 30. In this case, grooves corresponding to meshes described later are formed on the base pad 29.

The stay 25 is a support supporting the nip formation pad 24 toward the pressure roller 22. The stay 25 supporting the nip formation pad 24 prevents the bending of the nip formation pad 24 (in particular, bending throughout the length of the fixing belt 21) under pressure from the pressure roller 22. Such a configuration results in a uniform width of the fixing nip N in the longitudinal direction. The stay 25 is preferably made of iron-based metal such as steel use stainless (SUS) or steel electrolytic cold commercial (SECC) to enhance the rigidity.

The reflector 26 reflects radiant heat (infrared rays) emitted from the heaters 23.

The reflector 26 reflects, to the fixing belt 21, the radiant heat emitted from the heaters 23 to efficiently heat the fixing belt 21. As the reflector 26 is interposed between the stay 25 and the heaters 23, the reflector 26 also prevents heat conduction to the stay 25. The reflector 26 thus prevents the flow of heat to a component that does not directly contribute to fixing, to enhance the efficiency of energy consumption. The reflector 26 is made of, for example, metal such as aluminum or stainless steel. In particular, the reflector 26 including an aluminum base with a surface on which silver having a relatively high reflectance is deposited by vapor deposition further enhances the heating efficiency.

The belt holders 27 are a pair of rotator holders that holds the fixing belt 21 such that the fixing belt 21 can rotate. In other words, the fixing belt 21 is rotatably held by the belt holders 27. As illustrated in FIG. 3, the belt holders 27 are inserted into the loop formed by the fixing belt 21 at both end portions of the fixing belt 21 in the longitudinal direction to hold both ends of the inner circumferential surface of the fixing belt 21 such that the fixing belt 21 can rotate. Both end portions of the fixing belt 21 in the longitudinal direction described above are not limited to both edges of the fixing belt 21, which are the furthest ends of the fixing belt 21 in the longitudinal direction. Similarly, an "end portion" of the fixing belt 21 in the longitudinal direction, which is described below, is not limited to a longitudinal edge of the fixing belt 21, which is the furthest end of the fixing belt 21 in the longitudinal direction. The end portion of the fixing belt 21 in the longitudinal direction includes, in addition to the longitudinal edge of the fixing belt 21, a position within a range having one-third of the length of the fixing belt 21 from the edge of the fixing belt 21 in the longitudinal direction of the fixing belt 21. Accordingly, the belt holder 27 may hold a portion of the fixing belt 21 that is not the longitudinal edge of the fixing belt 21 as the end portion of the fixing belt 21 in addition to the longitudinal edge of the fixing belt 21.

Specifically, the belt holder 27 includes an insertion 27*a*, a restraint 27*b*, and a fixed portion 27*c*. The insertion 27*a* has a C-shaped cross-section and is inserted into the longitudinal end portion of the fixing belt 21. The restraint 27*b* has an outer diameter greater than that of the insertion 27*a*. The fixed portion 27*c* is fixed to a side plate described later. The restraint 27*b* has the outer diameter greater than that of at least the fixing belt 21 to restrain the deviation or movement of the fixing belt 21 in the longitudinal direction X. The insertion 27*a* is inserted into the longitudinal end portion of the fixing belt 21 to hold the inner circumferential surface of the longitudinal end portion of the fixing belt 21 such that the fixing belt 21 can rotate.

The temperature sensor 28 is a temperature detector that detects the temperature of the fixing belt 21. In the present embodiment, the temperature sensor 28 is a non-contact type temperature sensor that is disposed so as not to contact the outer circumferential surface of the fixing belt 21. In this case, the temperature sensor 28 detects the temperature of the outer circumferential face of the fixing belt 21. The temperature sensor 28 is not limited to the non-contact type temperature sensor and may be a contact type temperature sensor that contacts the fixing belt 21 to detect the surface temperature. The temperature sensor 28 may be, for example, a thermopile, a thermostat, a thermistor, in addition to the non-contact type (NC) temperature sensor.

The separator 31 is disposed downstream from the fixing nip N in the sheet conveyance direction and separates the sheet P that has passed through the fixing nip N from the surface of the fixing belt 21. Although the description of the separator is omitted in the following examples of the fixing devices, the following examples of the fixing devices may similarly include the separator downstream from the fixing nip N.

The fixing device 20 according to the present embodiment operates as follows.

A motor 104 in the body of the image forming apparatus drives and rotates the pressure roller 22 in a direction indicated by an arrow in FIG. 2, and the rotation of the pressure roller 22 rotates the fixing belt 21. The heaters 23 generate heat to heat the fixing belt 21. At this time, the temperature sensor 28 detects the temperature of the fixing belt 21, and a controller 101 receives detection signals from the temperature sensor, determine whether the temperature detected by the temperature sensor 28 is equal to or higher than a predetermined fixing temperature that can fix the toner image onto the sheet, and controls a power supply supplying power to the heaters 23 to control a heat generation amount of the heaters 23 based on the detected temperature so that the fixing belt 21 keeps the fixing temperature. After the temperature of the fixing belt 21 reaches the fixing temperature, the sheet P bearing the unfixed image passes through the nip N between the fixing belt 21 and the pressure roller 22, and the fixing belt 21 and the pressure roller 22 apply heat and pressure to the sheet P to fix the image onto the sheet P.

In the above-described fixing device including the nip formation pad 24, rotating the fixing belt 21 results in sliding the fixing belt 21 on the nip formation pad 24, which generates sliding friction between the fixing belt 21 and the nip formation pad 24. To reduce the sliding friction, typically, lubricant such as silicone oil, silicone grease, fluorine grease, or fluorine oil is applied between the fixing belt 21 and the nip formation pad 24. For example, the slide aid sheet 30 (see FIG. 2) containing the lubricant is disposed between the base pad 29 of the nip formation pad 24 and the inner circumferential surface of the fixing belt 21, and the lubricant oozes out from the slide aid sheet 30 to be interposed between the nip formation pad 24 and the fixing belt 21. The lubricant is a liquid or semi-solid substance that has lubricity.

In the above-described configuration including the pair of belt holders 27 holding the fixing belt 21, rotating the fixing belt 21 results in sliding the fixing belt 21 on each of the belt holders 27. Sliding the fixing belt 21 on the belt holder 27 generates the sliding friction between each of the belt holders 27 and the fixing belt 21. To reduce the sliding friction, the lubricant as described above is also interposed between each of the belt holders 27 and the fixing belt 21.

In the above-described configuration including the nip formation pad 24 and the belt holders 27, the lubricant such as silicone oil, silicone grease, fluorine grease, or fluorine oil is used to enhance a sliding performance of the fixing belt 21.

Figure 4:
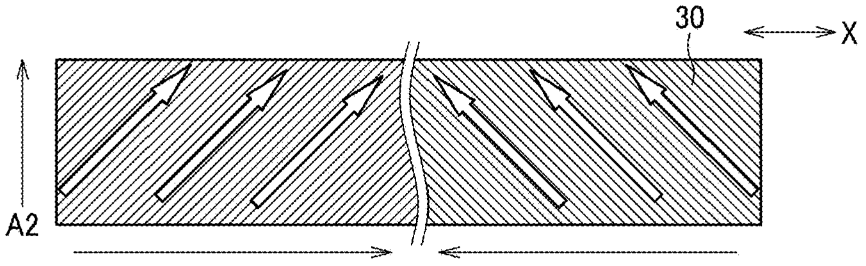
FIG. 4 is a schematic diagram of a slide aid sheet to illustrate a direction of a mesh of the slide aid sheet and a moving direction of lubricant while a fixing belt rotates in the forward direction.

As illustrated in FIG. 4, the slide aid sheet 30 has one side (the left side in FIG. 4) and the other side (the right side in FIG. 4) in the longitudinal direction. The one side of the slide aid sheet 30 in the longitudinal direction has a mesh extending in a direction inclined from the forward rotation direction A2 toward the other side of the slide aid sheet 30 in the longitudinal direction. The other side of the slide aid sheet 30 in the longitudinal direction has a mesh extending in a direction inclined from the forward rotation direction toward the one side of the slide aid sheet 30 in the longitudinal direction. In other words, the slide aid sheet 30 includes a first mesh and a second mesh. The first mesh extends in a first direction inclined to the forward rotation direction A2 from one end to the center of the slide aid sheet 30 in the longitudinal direction of the fixing belt 21. The second mesh extends in a second direction different from the first direction, and the second direction is inclined to the forward rotation direction A2 from another end to the center of the slide aid sheet 30 in the longitudinal direction of the fixing belt 21. Accordingly, rotating the fixing belt 21 in the direction indicated by the arrow A2 moves the lubricant on the surface of the slide aid sheet 30 to the center of the slide aid sheet 30 in the longitudinal direction along the mesh of the slide aid sheet 30. The above-described configuration can prevent the lubricant from leaking from the end of the slide aid sheet 30 in the longitudinal direction.

However, continuing the forward rotation of the fixing belt 21 generates a force that moves the lubricant between the slide aid sheet 30 and the fixing belt 21 toward the center of the slide aid sheet 30 in the longitudinal direction, and the force biases the lubricant toward the center of the slide aid sheet 30 in the longitudinal direction. In addition, the rotation of the fixing belt 21 and heat transferred from the fixing belt 21 to the belt holder 27 reduce the viscosity of the lubricant interposed between the belt holder 27 and the fixing belt 21 and may cause the lubricant to leak out and decrease the lubricant. As a result, the sliding friction between the belt holder 27 and the fixing belt 21 increases, and the wear of the fixing belt 21 increases. Abrasion powder is generated between the belt holder 27 and the fixing belt 21. Rotating the fixing belt 21 on the belt holder 27 on which the abrasion powder remains slightly vibrates the fixing belt 21 and causes resonance, which generates vibration noise.

Figure 5:
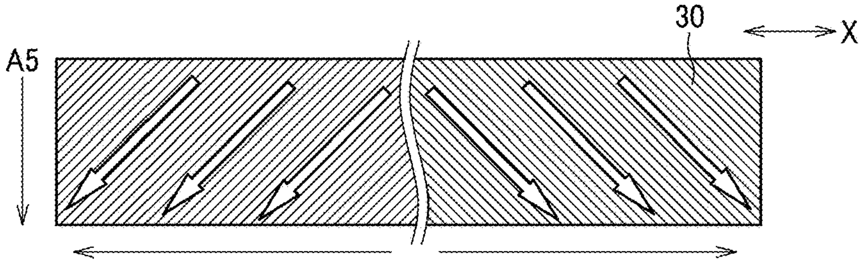
FIG. 5 is a schematic diagram of the slide aid sheet of FIG. 4 to illustrate a moving direction of lubricant while the fixing belt rotates in the reverse direction.

In contrast, the controller according to the present embodiment controls the motor to rotate the fixing belt 21 in the reverse direction indicated by the arrow A5 as illustrated in FIG. 5 (in other words, clockwise in FIG. 2) that is opposite to the direction of the forward rotation of the fixing belt 21 during the fixing operation, which is referred to as a reverse rotation operation. As a result, the lubricant can be moved toward both ends of the slide aid sheet 30 in the longitudinal direction. In other words, the lubricant is moved in the direction opposite to the direction in which the lubricant is moved during the forward rotation of the fixing belt 21. This can reduce the deviation of the lubricant in the longitudinal direction due to the forward rotation of the fixing belt 21. In addition, this can supply the lubricant interposed between the slide aid sheet 30 and the fixing belt 21 to the belt holder 27 and hold a sufficient amount of lubricant between the belt holder 27 and the fixing belt 21. As a result, the wear of the fixing belt 21 and the generation of the vibration noise can be prevented.

The reverse rotation operation cannot be performed during the image forming operation (during the fixing operation) because the fixing belt 21 rotates in the reverse direction. The reverse rotation operation is performed while the image forming apparatus does not form the image.

However, even if the reverse rotation operation is performed, moving the lubricant having too high viscosity in the longitudinal direction is difficult and cannot sufficiently reduce the deviation of the lubricant in the longitudinal direction. To countermeasure the above, the controller in the present embodiment executes the reverse rotation operation of the fixing belt 21 after the temperature of the fixing belt 21 reaches a predetermined temperature or higher. The predetermined temperature is set to a temperature at which the lubricant has a sufficient viscosity.

Figure 6:
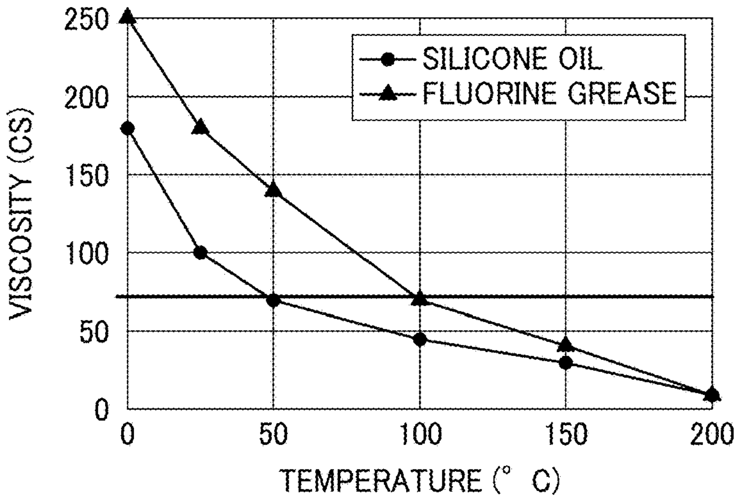
FIG. 6 is a graph illustrating a relationship between the temperature of the fixing belt and the viscosity of the lubricant.

FIG. 6 is a graph illustrating relations between the temperature of the fixing belt and the viscosity of silicone oil as the lubricant and the viscosity of fluorine grease as the lubricant. The horizontal axis represents the temperature [° C.] and the vertical axis represents the viscosity [centistokes (CS)].

As illustrated in FIG. 6, the viscosity of both the silicone oil and the fluorine grease decreases as the temperature increases. The viscosity of the lubricant in which rotating the fixing belt 21 in the reverse direction can sufficiently reduce the deviation of the lubricant in the longitudinal direction is equal to or smaller than a predetermined value that is experimentally determined. In experiments performed by the present inventors, the predetermined value of the lubricant was equal to or smaller than 70 CS. Based on results illustrated in FIG. 6, the viscosity of the silicone oil becomes the predetermined value or less at 50° C. or higher, and the viscosity of the fluorine grease becomes the predetermined value or less at 100° C. or higher.

The fixing device 20 in the present embodiment includes silicone oil as the lubricant, and based on the above results, the controller rotates the fixing belt 21 in the reverse direction in response to determining the temperature of the fixing belt 21 detected by the temperature sensor is equal to or higher than 50° C. As a result, the viscosity of the lubricant becomes the predetermined value or less, and the lubricant can move toward both ends of the slide aid sheet in the longitudinal direction to reduce the deviation of the lubricant in the longitudinal direction. In addition, this can supply the lubricant interposed between the slide aid sheet 30 and the fixing belt 21 to the belt holder 27 and hold a sufficient amount of lubricant between the belt holder 27 and the fixing belt 21. As a result, the wear of the fixing belt 21 and the generation of the vibration noise can be prevented.

In the fixing device including fluorine grease as the lubricant, the controller preferably rotates the fixing belt 21 in the reverse direction in response to determining the temperature of the fixing belt 21 is equal to or higher than 100° C. As a result, the lubricant can move toward both ends of the slide aid sheet in the longitudinal direction to reduce the deviation of the lubricant in the longitudinal direction. In addition, this can supply the lubricant interposed between the slide aid sheet 30 and the fixing belt 21 to the belt holder 27 and hold a sufficient amount of lubricant between the belt holder 27 and the fixing belt 21. As a result, the wear of the fixing belt 21 and the generation of the vibration noise can be prevented.

When some low-molecular-weight components of the lubricant are volatilized with an increase in the temperature of the fixing device and aggregated by being cooled in the atmosphere, fine particles are generated and may be released from the fixing device. The "fine particles" include fine particles (FP) and ultrafine particles (UFP) measured under measurement conditions for examining the relation described later with reference to FIG. 24. The "fine particles" are particles each having a diameter of 5.6 nm to 560 nm. In the following description, the fine particles and the ultrafine particles may be referred to simply as FP/UFP.

Currently, due to an increase in the awareness of environmental issues, the reduction of FP/UFP discharged from products has been desired. The image forming apparatuses that reduce the generation of FP/UFP are also to be developed.

Figure 24:
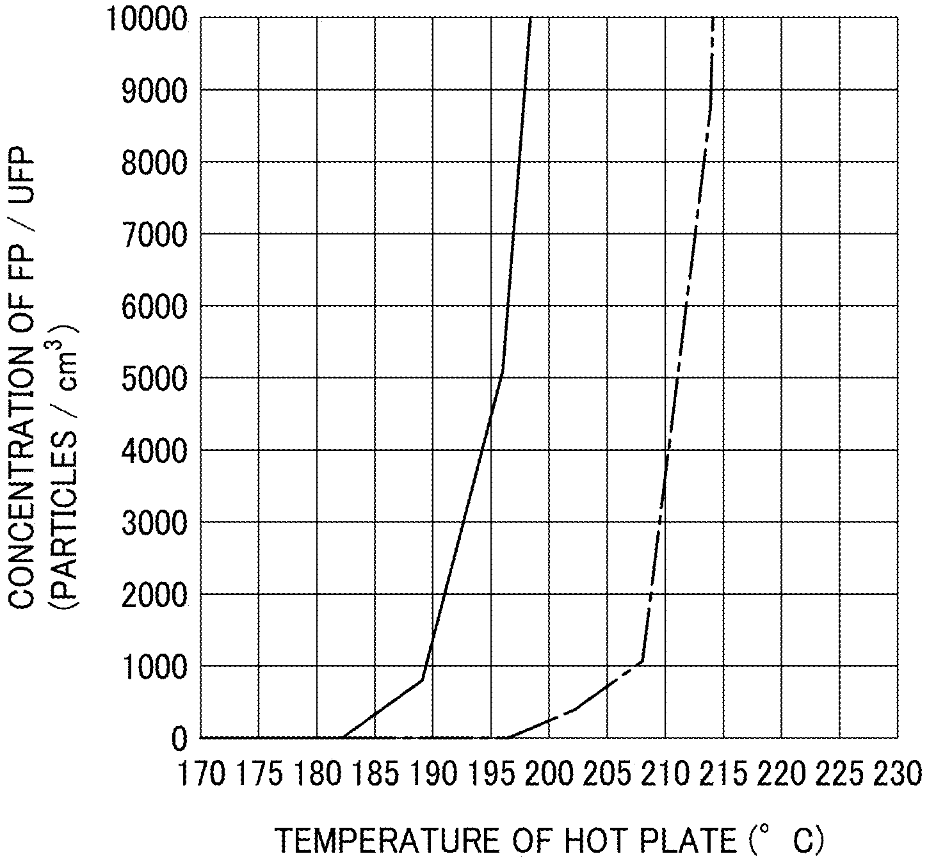
FIG. 24 is a graph illustrating an example relation between the temperature of lubricant and the concentration of generated fine particles.

In view of the above, to consider how to reduce the generation of FP/UFP from the fixing devices, the present inventors conducted experiments to examine the relation between the temperature rise of silicone oil and fluorine grease used as lubricants and the concentration of FP/UFP generated from the lubricants (the number of FP/UFP generated per 1 cm3). FIG. 24 illustrates the results.

Figure 25:
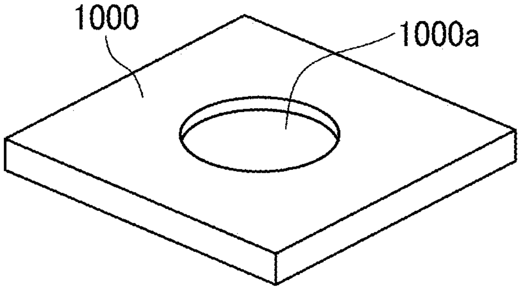
FIG. 25 is a perspective view of a sample container.

In the experiments, a liquid or semi-solid lubricating substance in a sample container was heated in a chamber of 1 m3 (with a ventilating frequency of 5 times) in accordance with Japanese Industrial Standards (JIS) A 1901. As illustrated in FIG. 25, an aluminum plate of 50 mm×50 mm×5 mm provided with a recess 1000*a* having a diameter of 22 mm and a depth of 2 mm was used as a sample container 1000. A sample was disposed in the recess 1000*a*. The sample container 1000 on which the sample was placed was placed on a hot plate of a heating device (Clean Hot Plate MH-180CS manufactured by AS ONE Corporation, Controller MH-3CS manufactured by AS ONE Corporation). The sample was heated at a preset temperature of 250° C. While the temperature of the hot plate was monitored, the number concentration of FP/UFP in the chamber was measured with a measuring device (Model 3091 FAST MOBILITY PARTICLE SIZER (FMPS), TSI Incorporated), with the Use Averaging Interval at Export of 30 seconds. Fluorine grease and silicone oil were used as lubricants with a sample amount of 36 microliters (μl). In FIG. 24, the solid line indicates the number concentration of FP/UFP generated from the fluorine grease, whereas the alternate long and short dash line indicates the number concentration of FP/UFP generated from the silicone oil. In FIG. 24, the horizontal axis indicates the temperature of the hot plate. Since the temperature rise of the hot plate and the temperature rise of the lubricant change substantially in synchronization with each other, the temperature of the hot plate is regarded as the temperature of the lubricant here.

As indicated by the solid line in FIG. 24, the generation of FP/UFP from the fluorine grease started when the temperature reached about 185° C. The number concentration of FP/UFP generated from the fluorine grease started rapidly increasing when the temperature exceeded about 194° C. On the other hand, as indicated by the alternate long and short dash line in FIG. 24, the generation of FP/UFP from the silicone oil started when the temperature reached about 200° C. The number concentration of FP/UFP generated from the silicone oil started rapidly increasing when the temperature exceeded about 210° C. The temperature at which the concentration rapidly increases is defined as a fine-particle generation temperature and is defined as a temperature at which the number concentration of FP/UFP in the chamber is equal to or greater than 4000/cm3.

As described above, since the FP/UFP are generated from the fluorine grease and the silicone oil when the temperature reaches 185° C. and 200° C., respectively, the FP/UFP may be generated from the lubricant in the fixing device in which the temperature can exceed 200° C.

However, the portion of the fixing device from which the FP/UFP are mostly generated has not been specified. For this reason, the inventors have conducted intensive studies on a main source that generates the FP/UFP. As a result, the inventors have found that a large amount of FP/UFP is generated mainly from the lubricant adhering to the belt holder. A description is now given of the mechanism of generation of FP/UFP and the reason why a large amount of FP/UFP is generated mainly from the lubricant adhering to the belt holder.

Figure 26:
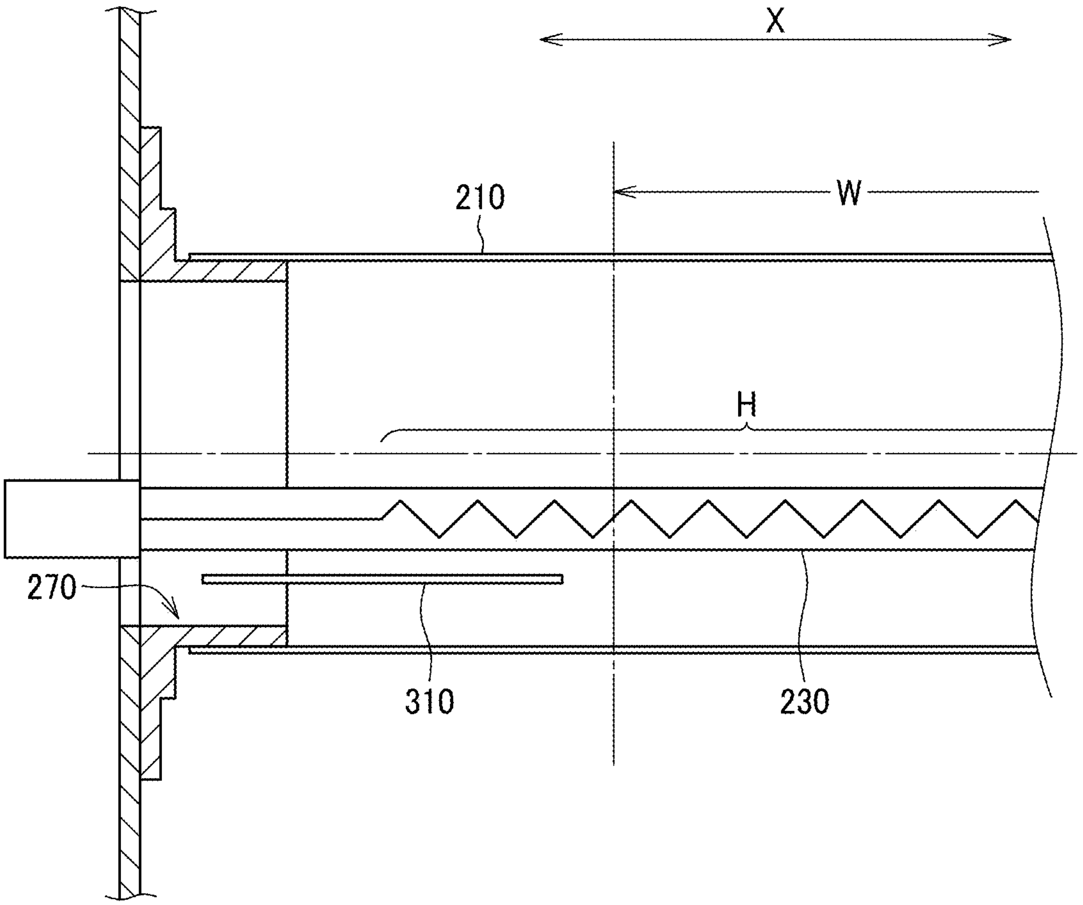
FIG. 26 is a cross-sectional view of an end portion of a fixing device according to a comparative example, taken along a longitudinal direction of a fixing belt included in the fixing device.

FIG. 26 is a cross-sectional view of the end portion of the fixing device according to a comparative example, taken along the longitudinal direction of the fixing belt included in the fixing device.

As illustrated in FIG. 26, the fixing device according to the comparative example includes a belt holder 270 that holds a longitudinal end portion of the fixing belt 210, like the fixing device according to the embodiment described above. Lubricant is applied on an outer circumferential surface of the belt holder 270 to reduce the sliding friction between the fixing belt 210 and the belt holder 270. Even if the lubricant is not applied to the outer circumferential surface of the belt holder 270, the lubricant interposed between the fixing belt 210 and a nip formation pad may flow with the rotation of the fixing belt 210 and adhere to the outer circumferential surface of the belt holder 270.

In the fixing device according to the comparative example, continuously performing fixing operations on multiple sheets continuously passing through the fixing device causes temperature rise in a non-sheet-passing region of the fixing belt 210 that is outside a maximum sheet passing region (a maximum recording medium region) W through which the sheet having the largest width of widths of the sheets used in the fixing device passes because the sheet passing through the fixing device does not consume heat in the non-sheet-passing region, accumulating heat. The heat transfers from the fixing belt 210 to the belt holder 270 holding the end of the fixing belt 210 in the longitudinal direction, the belt holder 270 is affected by the heat of the fixing belt 210, and the temperature of the belt holder 270 increases. In addition, a heater 230 has a heat generation portion H extending to the outside of the maximum sheet passing region W as illustrated in FIG. 26. Such a configuration remarkably increases the temperature rise in the non-sheet-passing region of the fixing belt 210 and remarkably increase the temperature rise in the belt holder 270. As described above, in the fixing device according to the comparative example, the temperature rise in the non-sheet-passing region of the fixing belt 210 that is the longitudinal end of the fixing belt 210 causes an excessive temperature rise in the belt holder 270 holding the longitudinal end of the fixing belt 210.

In the present embodiment, rotating the fixing belt 21 having the high temperature in the reverse direction to supply the lubricant to the longitudinal end of the slide aid sheet and the longitudinal end of the fixing belt 21 may promote the occurrence of FP/UFP.

For this reason, the controller preferably rotates the fixing belt 21 in the reverse direction in response to determining that the temperature of the fixing belt 21 detected by the temperature sensor is equal to or lower than 205° C. As a result, rotating the fixing belt 21 in the reverse direction at the temperature at which the FP/UFP are unlikely to occur from silicone oil as the lubricant as illustrated in FIG. 24 can reduce the FP/UFP. More preferably, the controller rotates the fixing belt 21 in the reverse direction in response to determining that the temperature of the fixing belt 21 detected by the temperature sensor is equal to or lower than 200° C. This can further reduce the FP/UFP that occurs from silicone oil as the lubricant. Further more preferably, the controller rotates the fixing belt 21 in the reverse direction in response to determining that the temperature of the fixing belt 21 is equal to or lower than 185° C. This can reduce the FP/UFP that occurs from fluorine grease as the lubricant in addition to silicone oil.

In the present embodiment, the controller executes the reverse rotation operation in which the controller controls the motor to rotate the fixing belt 21 in the reverse direction while the image forming apparatus does not form the image. In other words, the controller as circuitry controls the motor to rotate the fixing belt 21 in the reverse direction before or after a recording medium on which the image is formed passes through the fixing device as the heating device. The reverse rotation operation is preferably performed when the fixing belt 21 needs to be rotated for another purpose. Thus, the reverse rotation operation can be performed without increasing the rotation amount of the fixing belt 21. This can prevent the life of the fixing device 20 from being shortened by the reverse rotation operation. The examples of timing to rotate the fixing belt 21 are as follows. After the sheet passes through the fixing device 20, that is, after the end of the series of fixing operations, the fixing belt 21 rotates to uniform a heat distribution of the fixing belt 21. The fixing device 20 performs idling rotations to adjust temperature. In other words, the fixing device 20 rotates the fixing belt 21 to adjust temperature before or after the sheet passes through the fixing device 20. The fixing belt 21 rotates while the image forming apparatus performs an adjustment operation. The fixing belt 21 rotates while the image forming apparatus prepares printing. The fixing belt 21 rotates during a warm-up time. The fixing belt 21 rotates during a recovery mode to heat the fixing belt 21. In particular, the reverse rotation operation is preferably performed while the fixing device 20 rotates the fixing belt 21 to adjust temperature, or while the image forming apparatus performs the adjustment operation. Thus, the reverse rotation operation can be performed without causing image defects. In the above, the sheet as the recording medium does not pass through the fixing device 20 while the fixing belt 21 rotates.

Preferably, the fixing belt 21 is rotated in the reverse direction before the lubricant on the belt holder 27 is insufficient. To rotate the fixing belt 21 in the reverse direction at preferable timings, the controller in the present embodiment performs the reverse rotation operation of the fixing belt 21 when a travel distance of the fixing belt 21 reaches a predetermined value or more or when a predetermined number or more of sheets passes through the fixing device (the image forming apparatus).

Figure 7:
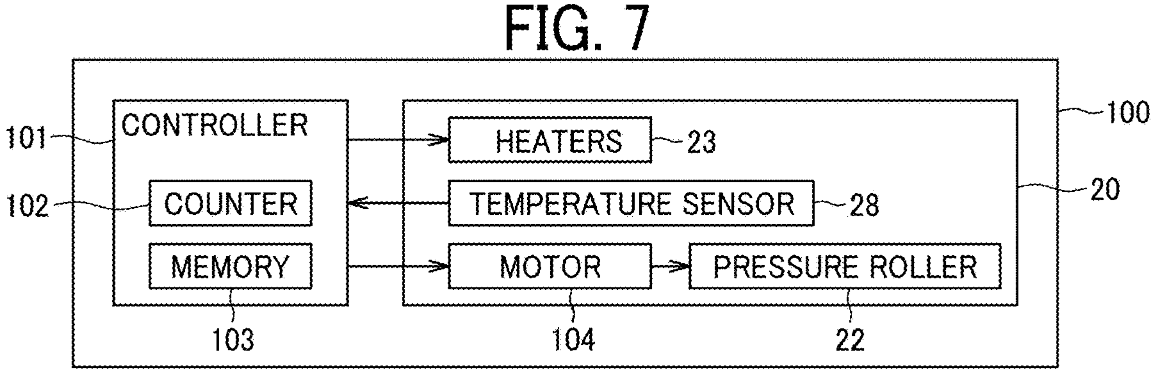
FIG. 7 is a functional block diagram illustrating a control configuration of the image forming apparatus.

FIG. 7 is a functional block diagram illustrating a control configuration of the image forming apparatus.

As illustrated in FIG. 7, the image forming apparatus 100 includes the controller 101. The controller 101 is the circuitry including a central processing unit (CPU), a random-access memory (RAM), and a read-only memory (ROM). The controller 101 includes a counter 102 and a memory 103. The counter 102 counts the number of sheets that has passed through the image forming apparatus, that is, the number of sheets that has passed through the fixing device, and the travel distance of the fixing belt 21. The memory 103 stores the cumulative number of sheets passing through the fixing device counted by the counter 102 or the cumulative travel distance of the fixing belt 21 counted by the counter 102. The controller 101 can calculate the travel distance of the fixing belt 21, for example, from the rotation time of the pressure roller 22 that rotates the fixing belt 21. In other words, the controller 101 can calculate the travel distance of the fixing belt 21 from the driving time of the motor 104 for rotating the pressure roller 22.

In response to the cumulative number or the cumulative travel distance stored in the memory 103 reaching to a predetermined value or more, the controller 101 controls the motor 104 to rotate in the reverse direction. As a result, the pressure roller 22 rotates in the reverse direction, and the fixing belt 21 is driven to rotate, so that the reverse rotation operation of the fixing belt 21 is performed. However, the reverse rotation operation is performed at a timing at which the reverse rotation operation of the fixing belt 21 described above is possible. After the reverse rotation operation is performed, the value stored in the memory 103 is reset.

The temperature detected by the temperature sensor 28 in the fixing device 20 is transmitted to the controller 101.

The controller 101 controls the power supply to supply power to the heaters 23 based on the temperature detected by the temperature sensor 28. In addition, the controller 101 determines whether the temperature detected by the temperature sensor 28 is within the above-described predetermined temperature range and controls the motor 104 to rotate the fixing belt 21 in the reverse direction in response to determining that the temperature is within the above-described temperature range.

In the above description, the nip formation pad 24 includes the base pad 29 and the slide aid sheet 30 disposed on the base pad 29 (see FIG. 2), and the slide aid sheet 30 has the mesh illustrated in FIG. 4. However, the base pad 29 may have grooves formed in the same directions as the directions of the mesh and functions as the slide aid, and the nip formation pad 24 may not include the slide aid sheet 30. Various fixing devices described below may have the above-described configurations. In the following description, the fixing devices each include the nip formation pad, the slide aid sheet, or a member corresponding to the nip formation pad, and the nip formation pad, the slide aid sheet, or the member corresponding to the nip formation pad has the mesh formed in the directions illustrated in FIG. 4 or the grooves formed in the directions illustrated in FIG. 4.

According to the embodiments of the present disclosure, the configuration of the fixing device is not limited to the configuration described above. The embodiments of the present disclosure may be applied to fixing devices having various configurations. A description is now given of some examples of the configuration of the fixing device to which the embodiments of the present disclosure are applicable.

Figure 8:
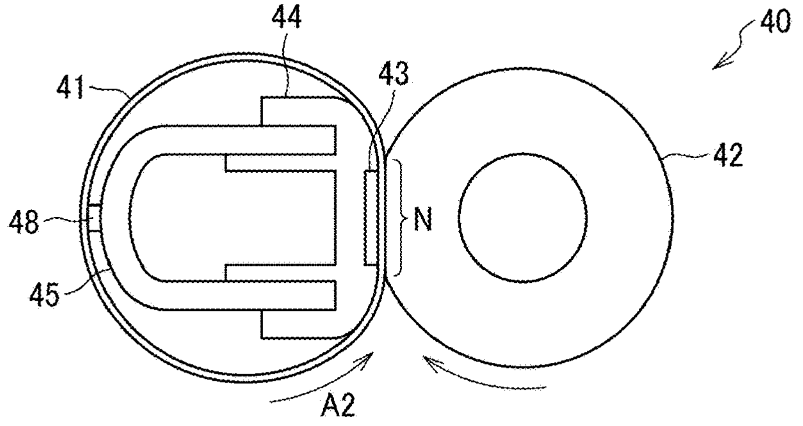
FIG. 8 is a schematic cross-sectional view of a fixing device that is different from the fixing device of FIG. 2 but applicable to the above-described embodiments.
Figure 9:
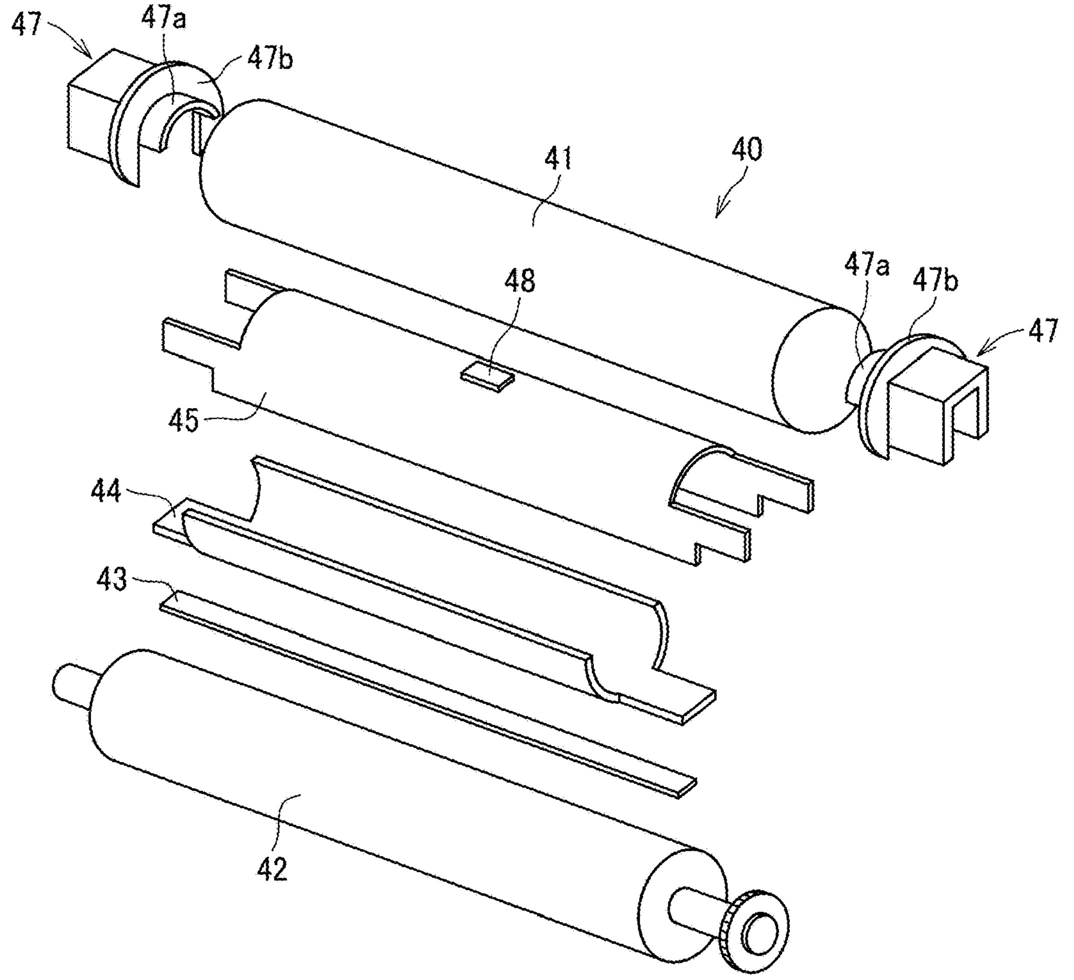
FIG. 9 is an exploded perspective view of the fixing device illustrated in FIG. 8.

A fixing device 40 illustrated in FIGS. 8 and 9 includes a fixing belt 41 as the belt, a pressure roller 42 as the pressure rotator, a heater 43 as the slide aid or a heat source, a heater holder 44 as a heat source holder, a pressure stay 45 as the support, a thermistor 48 as the temperature sensor, and flanges 47 (see FIG. 9) as rotator holders.

Functions and configurations of the fixing belt 41 and the pressure roller 42 illustrated in FIG. 8 are basically the same as those of the fixing belt 21 and the pressure roller 22 illustrated in FIG. 2.

The heater 43 is a ceramic heater including a plate-like substrate and a resistive heat generator disposed on the substrate. Flowing an electric current through the resistive heat generator causes the resistive heat generator to generate heat. The heater 43 is disposed so as to be in contact with the inner circumferential surface of the fixing belt 41, and the heater 43 generates heat to heat the inner circumferential surface of the fixing belt 41. In addition, the heater 43 also functions as the nip formation pad that forms the fixing nip N by sandwiching the fixing belt 41 with the pressure roller 42.

The heater holder 44 holds the heater 43. The heater holder 44 is made of, for example, a heat-resistant resin. The heater holder 44 has a half circle cross-sectional shape formed along the inner circumferential surface of the fixing belt 41 to restrict a rotational orbit of the fixing belt 41.

The pressure stay 45 is the support to support the heater holder 44. Since the pressure stay 45 supports the heater holder 44, the pressure stay 45 prevents bending of the heater holder 44 and the heater 43 due to pressure applied by the pressure roller 42 to form the fixing nip N having a uniform width between the pressure roller 42 and the fixing belt 41. The pressure stay 45 is preferably made of metal such as SUS in order to enhance rigidity.

The thermistor 48 as the temperature sensor is disposed on the pressure stay 45.

The thermistor 48 faces the inner circumferential surface of the fixing belt 41 in a contact or non-contact manner to detect the temperature of the fixing belt 41.

Similar to the above-described belt holders 27, the flanges 47 are a pair of holders holding both ends of the fixing belt 41 in the longitudinal direction of the fixing belt 41. The flange 47 has a backup portion 47*a* as the insertion to be inserted into the fixing belt 41 and a flange 47*b* as the restraint to restrain the movement of the fixing belt 41 in the longitudinal direction. A biasing member such as a spring presses the flange 47 against the end of the fixing belt 41 to hold the flange 47 inserted into the loop of the fixing belt 41.

The above-described fixing device 40 includes the lubricant held between the fixing belt 41 and the heater 43 and between the fixing belt 41 and the flange 47. Accordingly, applying the present embodiments to the fixing device 40 illustrated in FIGS. 8 and 9 also enables preventing the deviation of the lubricant.

Figure 10:
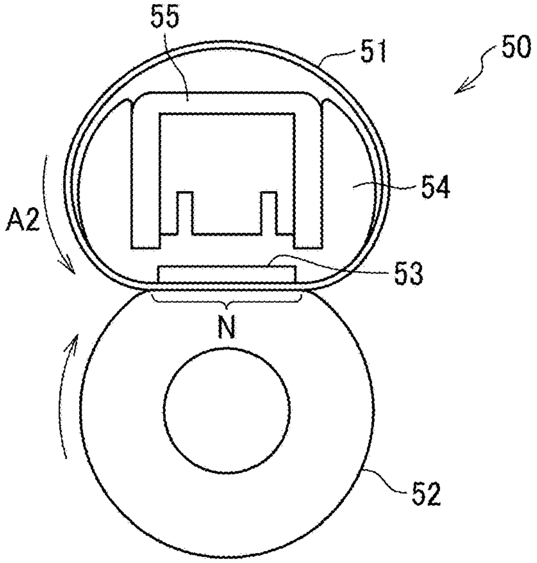
FIG. 10 is a cross-sectional view of a fixing device that is different from the fixing devices illustrated above but applicable to the above-described embodiments.
Figure 11:
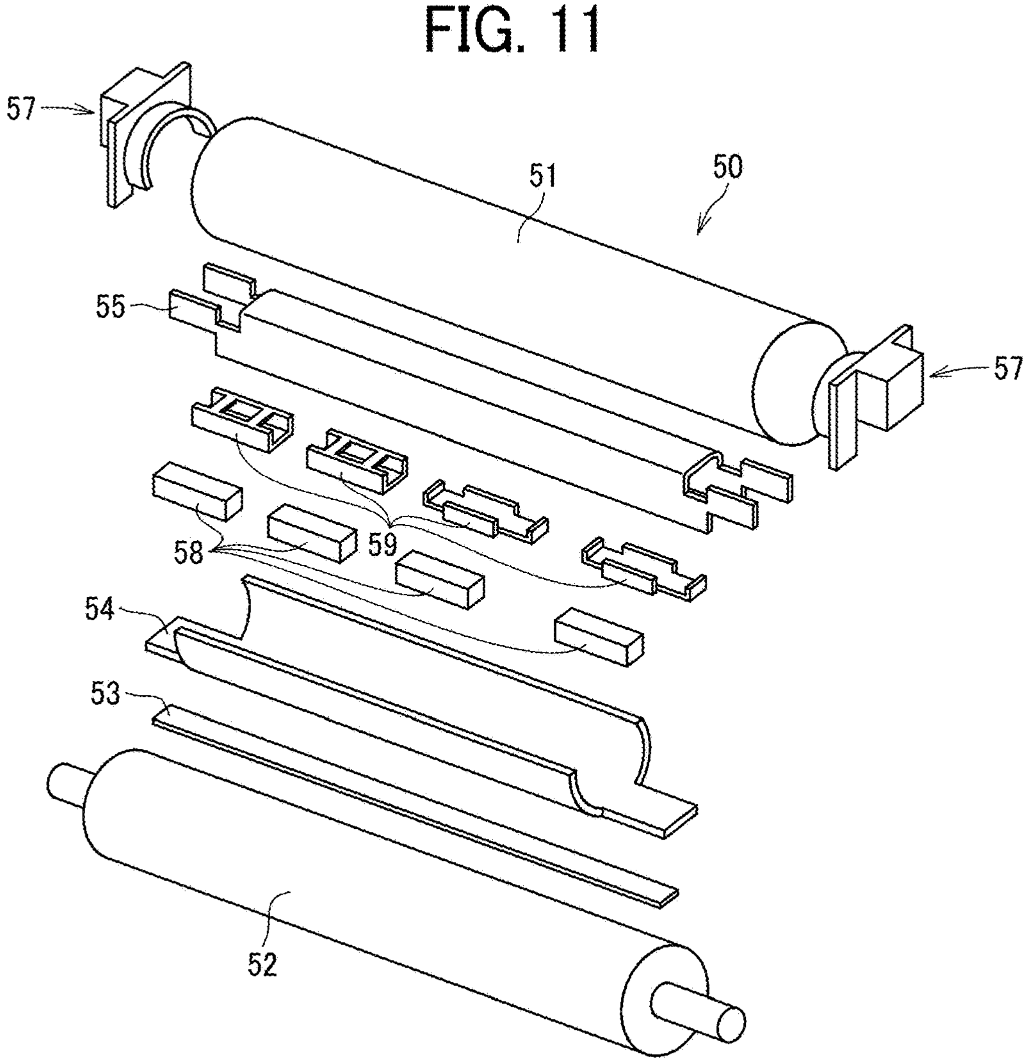
FIG. 11 is an exploded perspective view of the fixing device illustrated in FIG. 10.

Subsequently, a fixing device 50 illustrated in FIGS. 10 and 11 is described. Similar to the fixing device 40 illustrated in FIGS. 8 and 9, the fixing device 50 includes the ceramic heater (that is a heater 53). Specifically, the fixing device 50 illustrated in FIGS. 10 and 11 includes a fixing belt 51 as the belt, a pressure rotator 52 as the pressure rotator, the heater 53 as the heat source, a heater holder 54 as the heat source holder, a reinforcement 55, belt holders 57 as the belt holders (see FIG. 11), heat-sensitive members 58 (see FIG. 11) as the temperature sensor, and covers 59 (see FIG. 11).

Functions and configurations of the fixing belt 51, the pressure rotator 52, the heater 53, the heater holder 54, the reinforcement 55, and the belt holders 57 illustrated in FIGS. 10 and 11 are basically the same as those of the fixing belt 41, the pressure roller 42, the heater 43, the heater holder 44, the pressure stay 45, and the flanges 47 illustrated in FIGS. 8 and 9.

The heat-sensitive members 58 are disposed on a side of the heater holder 54 opposite a side of the heater holder 54 to hold the heater 53 and detect the temperature of the heater 53 via the heater holder 54. Based on temperatures detected by the heat-sensitive members 58, heat generation of the heater 53 is controlled so that the fixing belt 51 is maintained at a predetermined fixing temperature.

The covers 59 are box-shaped members made of heat-resistant resin. Each cover 59 is disposed so as to face the heater holder 54 via the heat-sensitive member 58 inside the loop of the fixing belt 51 to cover the corresponding heat-sensitive member 58.

As described above, the fixing device to which the present disclosure is applied may include the heat-sensitive member 58 that detects the temperature of the heater 53 and the cover 59 that covers the heat-sensitive member 58.

Figure 12:
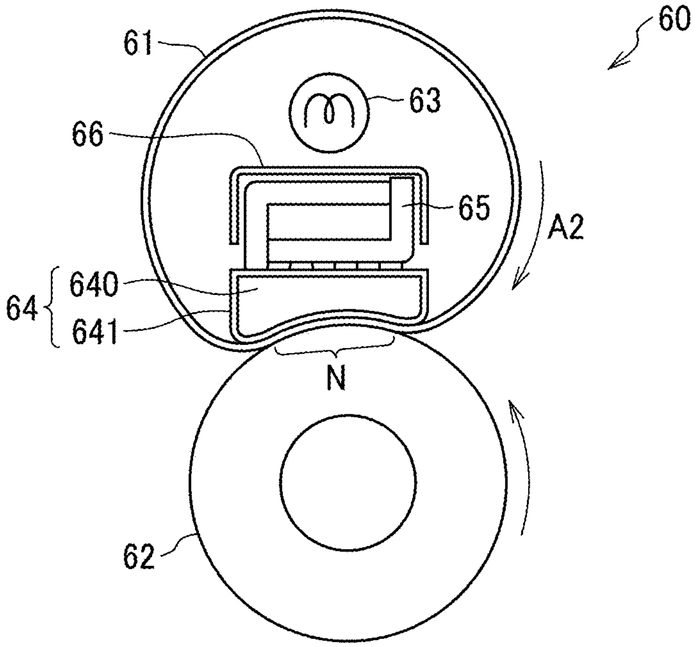
FIG. 12 is a cross-sectional view of a fixing device that is different from the fixing devices illustrated above but applicable to the above-described embodiments.
Figure 13:
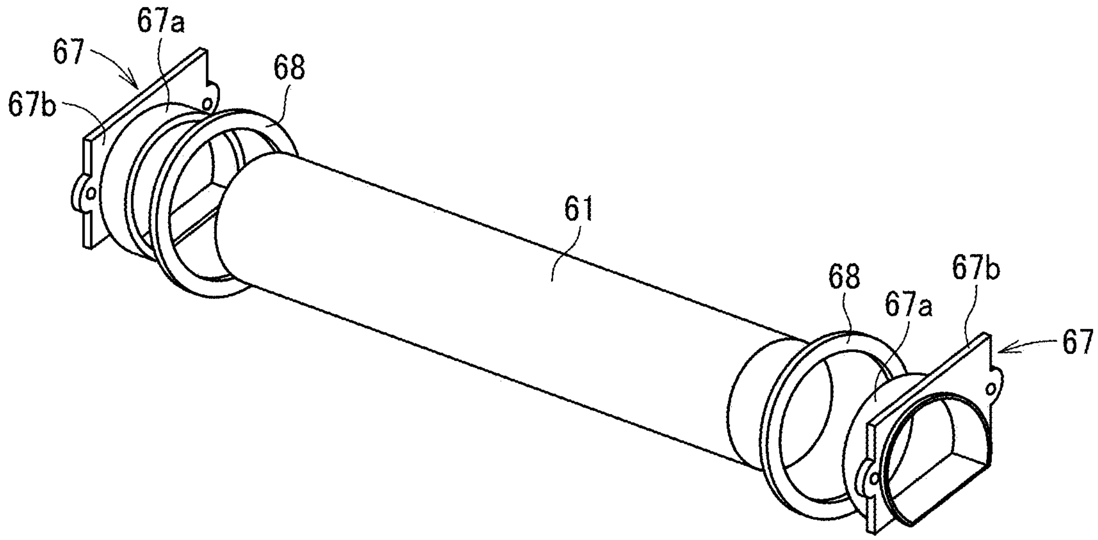
FIG. 13 is an exploded perspective view of the fixing device illustrated in FIG. 12.

Subsequently, a fixing device 60 illustrated in FIGS. 12 and 13 is described. Similar to the fixing device 20 illustrated in FIGS. 2 and 3, the fixing device 60 includes the halogen heater (that is a heater 63). Specifically, the fixing device 60 illustrated in FIGS. 12 and 13 includes a fixing belt 61 as the belt, a pressure roller 62 as the pressure rotator, the heater 63 as the heat source, a nip formation pad 64, a support 65 as the support, a reflective plate 66 as the reflector, retention frames 67 as the rotator holders (see FIG. 13), and rings 68 (see FIG. 13).

Functions and configurations of the fixing belt 61, the pressure roller 62, the heater 63, the nip formation pad 64, the support 65, the reflective plate 66, and the retention frames 67 illustrated in FIGS. 12 and 13 are basically the same as those of the fixing belt 21, the pressure roller 22, the heater 23, the nip formation pad 24, the stay 25, the reflector 26, and the belt holders 27 illustrated in FIGS. 2 and 3. The nip formation pad 64 includes a metal base pad 640 and a fluororesin slide aid sheet 641 that is interposed between the base pad 640 and an inner circumferential surface of the fixing belt 61. The slide aid sheet 641 is the slide aid of the present embodiment.

The ring 68 is mounted on an outer circumferential surface of a cylindrical portion 67*a* as the insertion of the retention frame 67 that is inserted into the loop formed by the fixing belt 61. The ring 68 is interposed between a longitudinal edge of the fixing belt 61 and a fixing plate 67*b* as the restraint of the retention frame 67. As the fixing belt 61 rotates, the ring 68 rotates together with the fixing belt 61, or the fixing belt 61 slides over the low-friction ring 68. Thus, the sliding friction that is generated between the fixing belt 61 and the retention frame 67 is reduced.

According to one or more embodiments of the present disclosure, the fixing device may include the rings 68 as described above.

Figure 14:
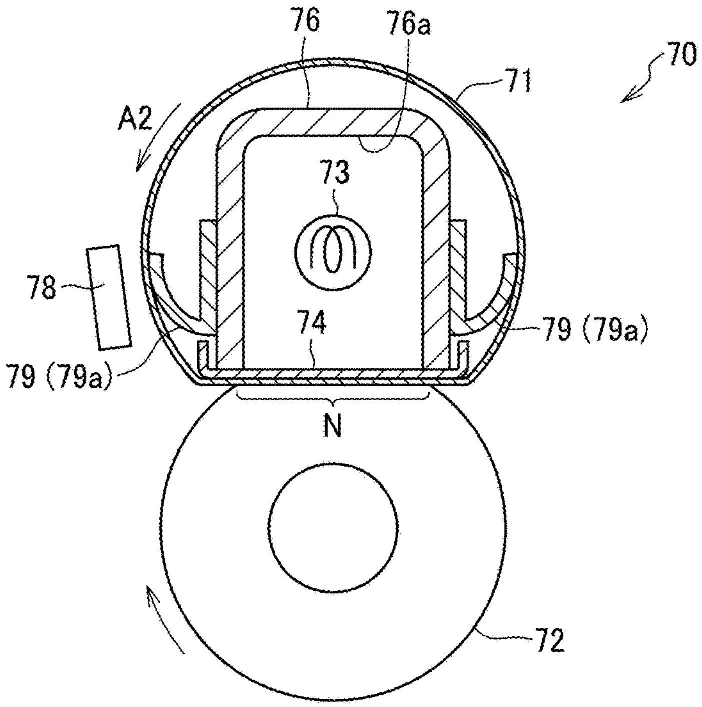
FIG. 14 is a cross-sectional view of a fixing device that is different from the fixing devices illustrated above but applicable to the above-described embodiments.
Figure 15:
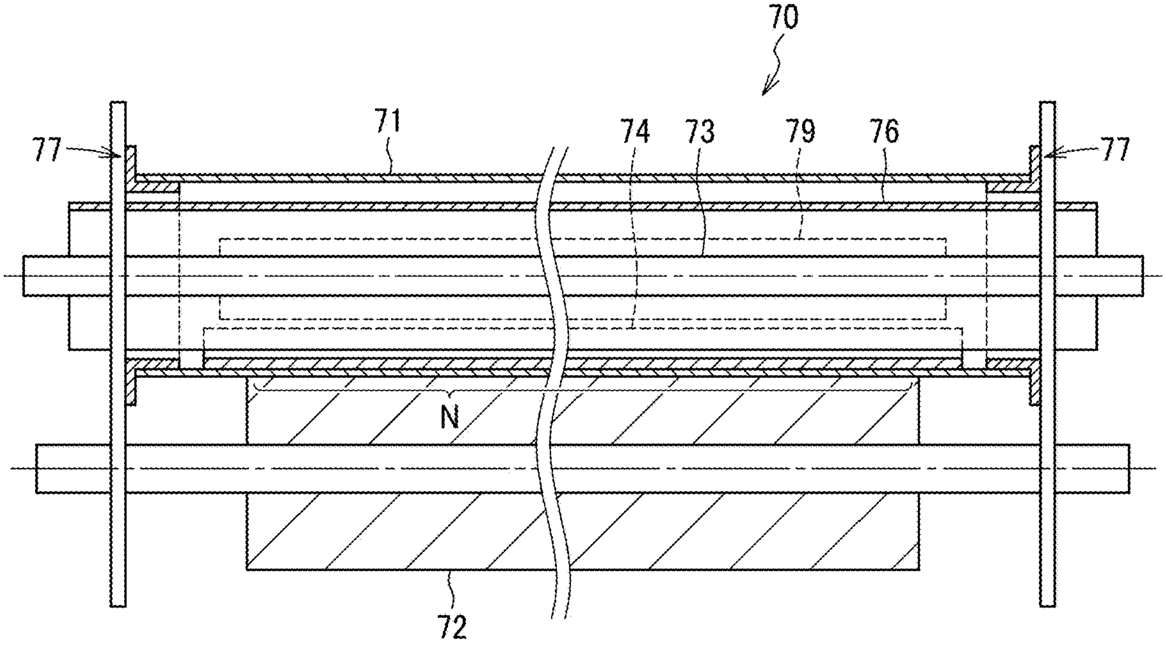
FIG. 15 is a cross-sectional view of the fixing device illustrated in FIG. 14, taken along a longitudinal direction of a fixing belt included in the fixing device.

Subsequently, a fixing device 70 illustrated in FIGS. 14 and 15 is described. Similar to the fixing device 20 illustrated in FIGS. 2 and 3, the fixing device 70 includes a halogen heater 73. Specifically, the fixing device 70 illustrated in FIGS. 14 and 15 includes a fixing belt 71 as the belt, a pressure roller 72 as the pressure rotator, the halogen heater 73 as the heat source, a nip formation pad 74 as the slide aid, a reflector 76, belt supports 77 as belt holders (see FIG. 15), a temperature sensor 78 as the temperature sensor, and guides 79.

The fixing belt 71, the pressure roller 72, the halogen heater 73, the nip formation pad 74, the reflector 76, the belt supports 77, and the temperature sensor 78 that are illustrated in FIGS. 14 and 15 are basically the same in function as the fixing belt 21, the pressure roller 22, the heater 23, the nip formation pad 24, the reflector 26, the belt holders 27, and the temperature sensor 28, respectively, illustrated in FIGS. 2 and 3.

The nip formation pad 74 has grooves formed in the directions as illustrated in FIG. 4 on a slide face on which the fixing belt 71 slides and holds the lubricant between the nip formation pad 74 and the fixing belt 71. The reflector 76 illustrated in FIGS. 14 and 15 reflects the radiant heat (infrared rays) emitted from the halogen heater 73 mainly to the nip formation pad 74, not to the fixing belt 71. The reflector 76 has a U-shaped cross-section to cover the outside of the halogen heater 73. The reflector 76 has an inner face 76*a* facing the halogen heater 73 and serving as a reflecting surface having a relatively high reflectance. When the radiant heat is emitted from the halogen heater 73, the inner face 76*a* of the reflector 76 reflects the radiant heat to the nip formation pad 74.

As a result, the nip formation pad 74 is heated by the radiant heat emitted from the halogen heater 73 toward the nip formation pad 74 and the radiant heat reflected by the reflector 76 to the nip formation pad 74. The heat is conducted from the nip formation pad 74 to the fixing belt 21 at the nip N. In this case, the nip formation pad 74 that forms the nip N functions as a heat conductor that conducts heat to the fixing belt 71 at the nip N. To conduct heat, the nip formation pad 74 is made of metal having good thermal conductivity such as copper or aluminum.

The reflector 76 also functions as the support (in other words, the stay) that supports the nip formation pad 74. Since the reflector 76 supports the nip formation pad 74 throughout the length of the fixing belt 71, the bending of the nip formation pad 74 is prevented, and the nip N having a uniform width is formed between the fixing belt 71 and the pressure roller 72. The reflector 76 is preferably made of metal having relatively high rigidity such as SUS or SECC to enhance the function as the support.

The guides 79 are disposed inside the loop of the fixing belt 71 to guide the inner circumferential surface of the fixing belt 71 rotating. Each of the guides 79 has a guide face 79*a* curving along the inner circumferential surface of the fixing belt 71. As the fixing belt 71 is guided along the guide face 79*a*, the fixing belt 71 smoothly rotates without being largely deformed.

According to one or more embodiments of the present disclosure, the fixing device may conduct heat from the halogen heater 73 via the nip formation pad 74 having good thermal conductivity to heat the fixing belt 71 as described above.

Figure 16:
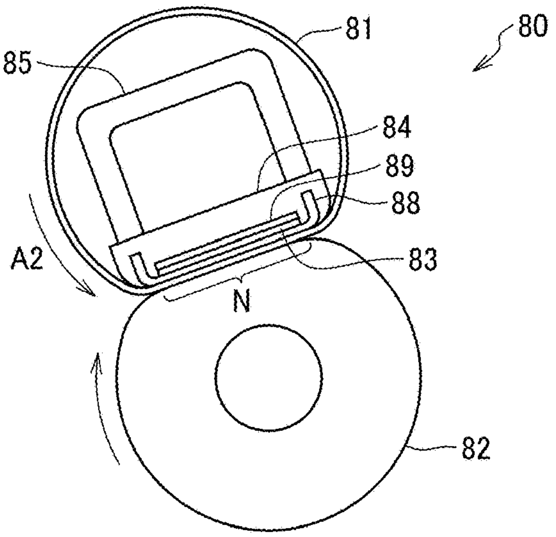
FIG. 16 is a cross-sectional view of a fixing device that is different from the fixing devices illustrated above but applicable to the above-described embodiments.
Figure 17:
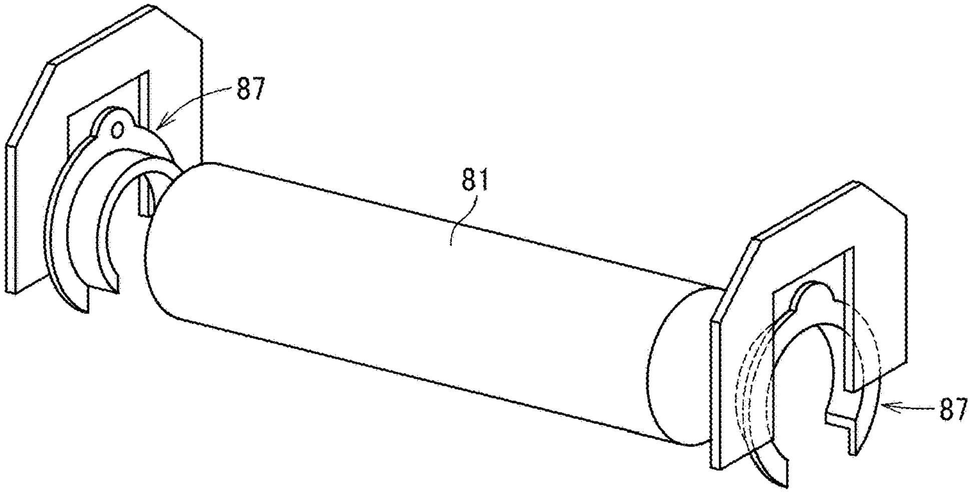
FIG. 17 is an exploded perspective view of the fixing device illustrated in FIG. 16.

Subsequently, a fixing device 80 illustrated in FIGS. 16 and 17 is described. Similar to the fixing device 40 illustrated in FIGS. 8 and 9, the fixing device 40 includes the ceramic heater (that is a heater 83). The fixing device 80 illustrated in FIGS. 16 and 17 includes a fixing belt 81 as the belt, a pressure roller 82 as the pressure rotator, the heater 83 as the heat source, a holder 84 as the heat source holder, a stay 85 as the support, arc-shaped guides 87 (see FIG. 17) as the belt holders, a heat diffuser 88 as the heat conductor or the slide aid, and a heat retaining plate 89 as a heat insulator.

Functions of the fixing belt 81, the pressure roller 82, the heater 83, the holder 84, the stay 85, and the arc-shaped guides 87 illustrated in FIGS. 16 and 17 are basically the same as the functions of the fixing belt 41, the pressure roller 42, the heater 43, the heater holder 44, the pressure stay 45, and the flanges 47 illustrated in FIGS. 8 and 9, respectively. In addition to the heater 83, the holder 84 holds the heat diffuser 88 and the heat retaining plate 89 that are overlaid.

The heat diffuser 88 is made of metal such as stainless steel, aluminum alloy, or iron. The heat diffuser 88 is disposed so as to be in contact with the inner circumferential surface of the fixing belt 81, transmits heat generated by the heater 83 to the fixing belt 81, and is in contact with the pressure roller 82 via the fixing belt 81 to form the nip N. Thermal conductive grease is applied between the heater 83 and the heat diffuser 88 to enhance heat transfer efficiency from the heater 83 to the heat diffuser 88. On the other hand, the heat retaining plate 89 is disposed on a side of the heater 83 opposite a side of the heater 83 facing the heat diffuser 88 to prevent the heat of the heater 83 from being transmitted to the holder 84 and the stay 85.

Since the fixing belt 81 rotates and slides on the heat diffuser 88, the lubricant is applied between the fixing belt 81 and the heat diffuser 88 to enhance sliding performance. A slide face of the heat diffuser 88 in contact with the fixing belt 81 is formed with a surface layer such as a glass coating layer or a hard chromium plating layer each having low friction and wear resistance.

The above-described fixing device 80 includes the lubricant held between the fixing belt 81 and the heat diffuser 88 and between the fixing belt 81 and the arc-shaped guides 87. Accordingly, applying the present embodiments to the fixing device 80 illustrated in FIGS. 16 and 17 also enables preventing the deviation of the lubricant.

Figure 18:
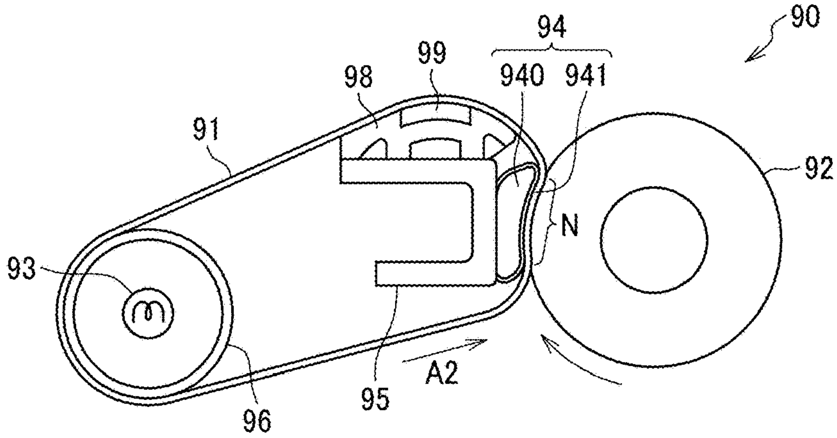
FIG. 18 is a cross-sectional view of a fixing device that is different from the fixing devices illustrated above but applicable to the above-described embodiments.
Figure 19:
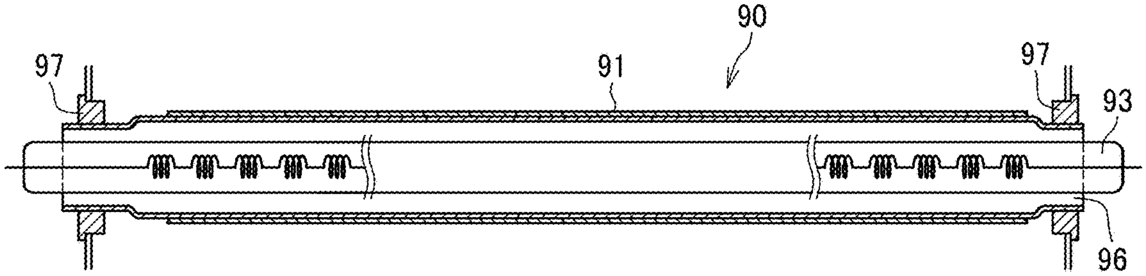
FIG. 19 is a schematic cross-sectional view of a holding structure to hold a pressure roller illustrated in FIG. 18.

Subsequently, a fixing device 90 illustrated in FIGS. 18 and 19 is described below. The fixing device 90 includes an endless belt 91 as the belt, a heating roller 96 as a heating member, a heater 93 as the heat source, a pressure roller 92 as the pressure rotator, a nip formation pad 94, a support 95, a guide 98, a lubricant applicator 99 as a lubricant supplier, and bearings 97 (see FIG. 19) as the belt holders.

As illustrated in FIG. 18, the belt 91 is wound around the heating roller 96, the nip formation pad 94, and the guide 98. A spring presses the heating roller 96 in a direction away from the nip formation pad 94 to apply a predetermined tension to the belt 91. Driving the pressure roller 92 to rotate causes the belt 91 applied the predetermined tension to be driven to rotate.

The nip formation pad 94 includes a pressing member 940 and a low-friction slide aid sheet 941 that is interposed between the pressing member 940 and the inner circumferential surface of the fixing belt 91. The slide aid sheet 941 is the slide aid of the present embodiment. The pressing member 940 is supported by the support 95 to receive the pressing force of the pressure roller 92 and form the nip N.

The heater 93 is the halogen heater and is disposed in the heating roller 96. The heater 93 generating heat heats the heating roller 96, and the heat of the heating roller 96 is transmitted to the belt 91.

The lubricant applicator 99 comes into contact with the inner circumferential surface of the belt 91 and supplies the lubricant to enhance slidability with respect to the inner circumferential surface of the belt 91. The lubricant supplied to the inner circumferential surface of the belt 91 is interposed between the guide 98 and the belt 91 and between the nip formation pad 94 and the belt 91 as the belt 91 rotates, so that the belt 91 can smoothly rotate.

The heating roller 96 is generally held by bearings 97 such as slide bearings or ball bearings so as to be rotatable. The bearings 97 as the belt holders are attached to both ends of the heating roller 96 in the axial direction of the heating roller 96 (in other words, in the longitudinal direction of the heating roller 96). The lubricant is applied to the bearings 97 to reduce sliding friction and rotational torque while the heating roller 96 rotates.

Accordingly, applying the present embodiments to the fixing device 90 illustrated in FIGS. 18 and 19 also enables preventing the deviation of the lubricant.

Figure 20:
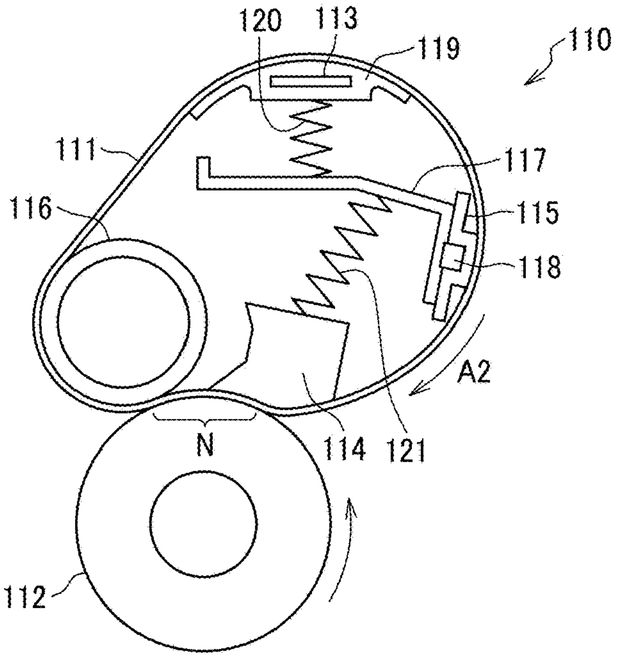
FIG. 20 is a cross-sectional view of a fixing device that is different from the fixing devices illustrated above but applicable to the above-described embodiments.
Figure 21:
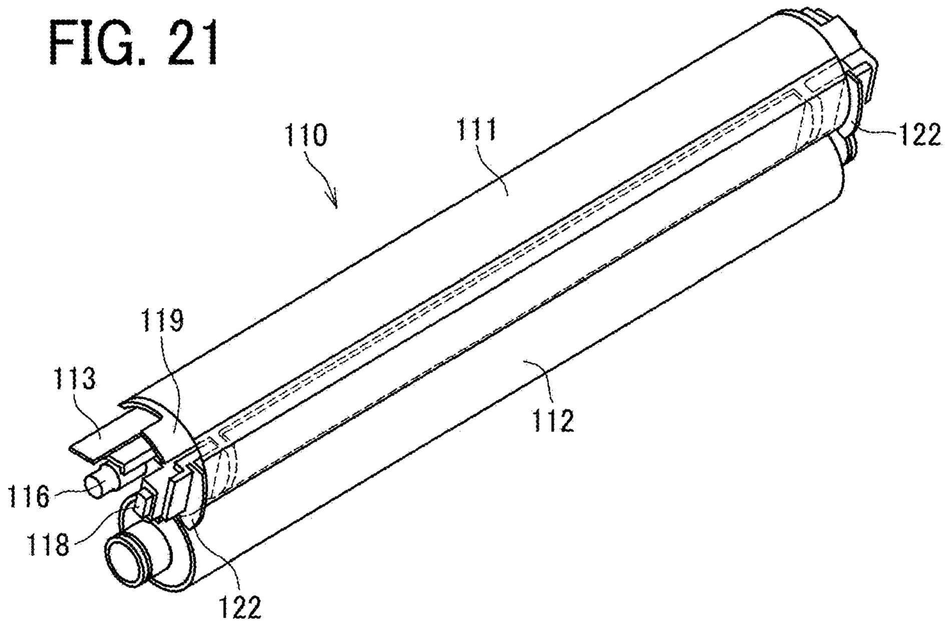
FIG. 21 is a perspective view of a part of the fixing device illustrated in FIG. 20.

The embodiments of the present disclosure are applicable to a fixing device 110 illustrated in FIGS. 20 and 21.

The fixing device 110 illustrated in FIGS. 20 and 21 is described below. The fixing device 110 includes a fixing belt 111 as the belt, a fixing roller 116, a pressure roller 112 as the pressure rotator, a heater 113 as the heat source, a pressing pad 114 as the slide aid, a guide 115, a support 117, a temperature sensor 118 as the temperature sensor, a heat transferor 119, and belt holders 122 (see FIG. 21) as the belt holders.

The fixing belt 111 illustrated in FIG. 20 is wound around the fixing roller 116, the pressing pad 114, the guide 115, and the heat transferor 119. The fixing roller 116 is rotated by the rotation of the pressure roller 112.

The heater 113 is a planar heater or a plate-shaped heater such as the ceramic heater and disposed in the heat transferor 119. The heat transferor 119 is interposed between the heater 113 and the fixing belt 111 to transfer the heat of the heater 113 to the fixing belt 111. A spring 120 attached to the support 117 biases the heat transferor 119 against the fixing belt 111 so that the heat transferor 119 comes into contact with the inner circumferential surface of the fixing belt 111.

Another spring 121 attached to the support 117 biases the pressing pad 114 against the fixing belt 111 so that the pressing pad 114 comes into contact with the inner circumferential surface of the fixing belt 111. As a result, the pressing pad 114 is pressed against the pressure roller 112 via the fixing belt 111 to form the nip N between the fixing belt 111 and the pressure roller 112.

The guide 115 is attached to and supported by the support 117. A temperature sensor 118 is attached to the guide 115 and detects the temperature of the fixing belt 111.

The belt holders 122 hold both ends of the fixing belt 111.

The fixing device 110 illustrated in FIG. 20 also includes the lubricant held between the fixing belt 111 and the pressing pad 114 and between the fixing belt 111 and the belt holders 122. Accordingly, applying the present embodiments of the present disclosure to the above-described fixing device 110 can also effectively prevent the occurrence of the fine particles including the ultrafine particles similar to the above-described embodiments.

In the above description, the embodiments of the present disclosure are applied to the fixing device incorporated in the electrophotographic image forming apparatus as illustrated in FIG. 1. However, the present disclosure is not limited to this. The embodiments of the present disclosure may be applied to a heating device other than the fixing device, such as a drying device that is included in an inkjet image forming apparatus and dries liquid such as ink applied to a sheet.

Figure 22:
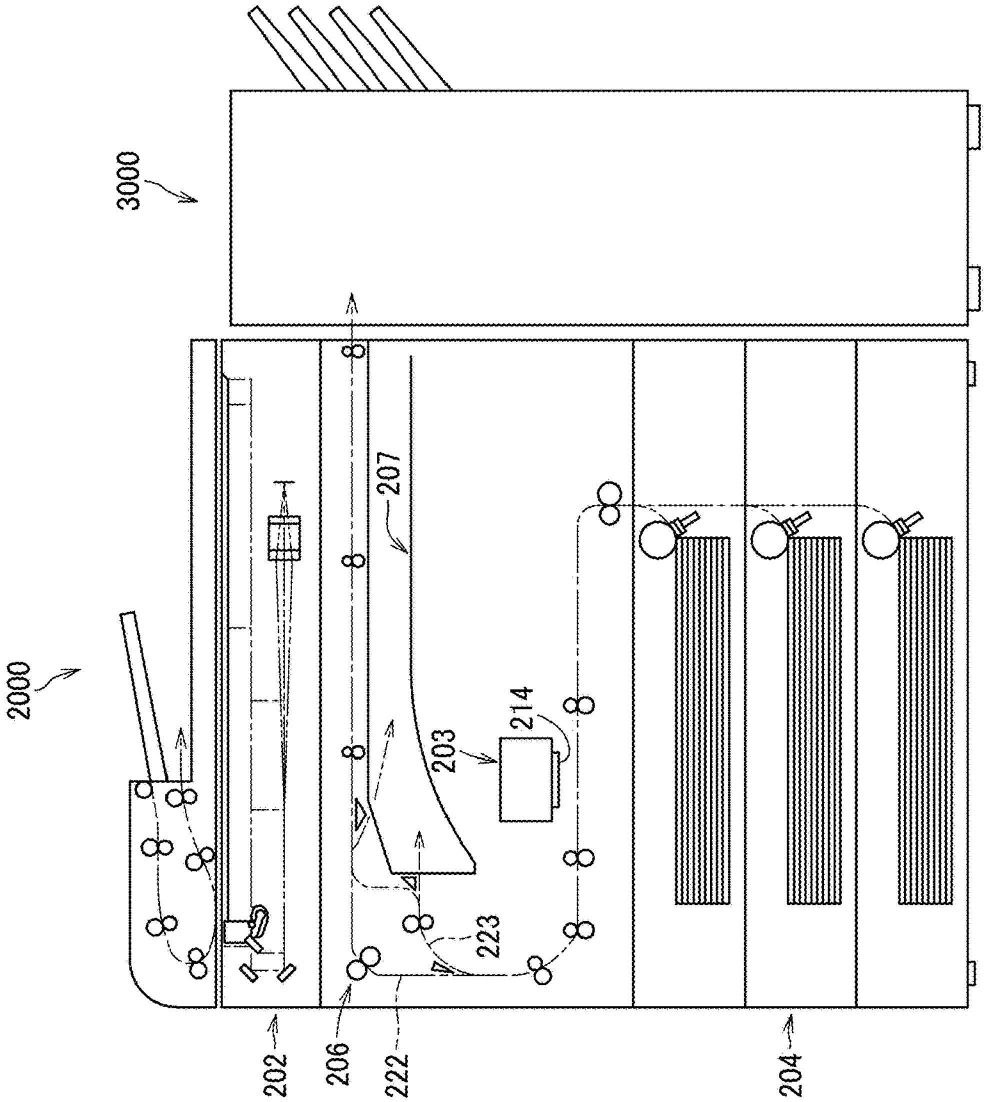
FIG. 22 is a schematic cross-sectional view of an inkjet image forming apparatus including a drying device, according to an embodiment of the present disclosure.

FIG. 22 illustrates an inkjet image forming apparatus 2000 including a drying device 206 according to an embodiment of the present disclosure.

The inkjet image forming apparatus 2000 illustrated in FIG. 22 includes an image reading device 202, an image forming device 203, a sheet supplying device 204, the drying device 206, and an output section 207. A sheet aligning apparatus 3000 is disposed beside the inkjet image forming apparatus 2000.

In response to an instruction to start a printing operation, the sheet supplying device 204 feeds a sheet such as a sheet of paper as a recording medium in the inkjet image forming apparatus 2000. When the sheet is conveyed to the image forming device 203, the image forming device 203 discharges ink from a liquid discharge head 214 to the sheet according to the image data of a document read by the image reading device 202 or print data instructed to print by a terminal, to form an image on the sheet.

The sheet bearing the image is selectively guided to a conveyance passage 222 or a conveyance passage 223. When the sheet is guided to the conveyance passage 222, the sheet passes through the drying device 206. When the sheet is guided to the conveyance passage 223, the sheet does not pass through the drying device 206. When the sheet is guided to the drying device 206, the drying device 206 accelerates the drying of the ink on the sheet. The sheet is then guided to the output section 207 or the sheet aligning apparatus 3000. By contrast, when the sheet is guided to the conveyance passage 223 along which the sheet does not pass through the drying device 206, the sheet is directly guided to the output section 207 or the sheet aligning apparatus 3000. The sheet aligning apparatus 3000 aligns and places the sheets guided to the sheet aligning apparatus 3000.

Figure 23:
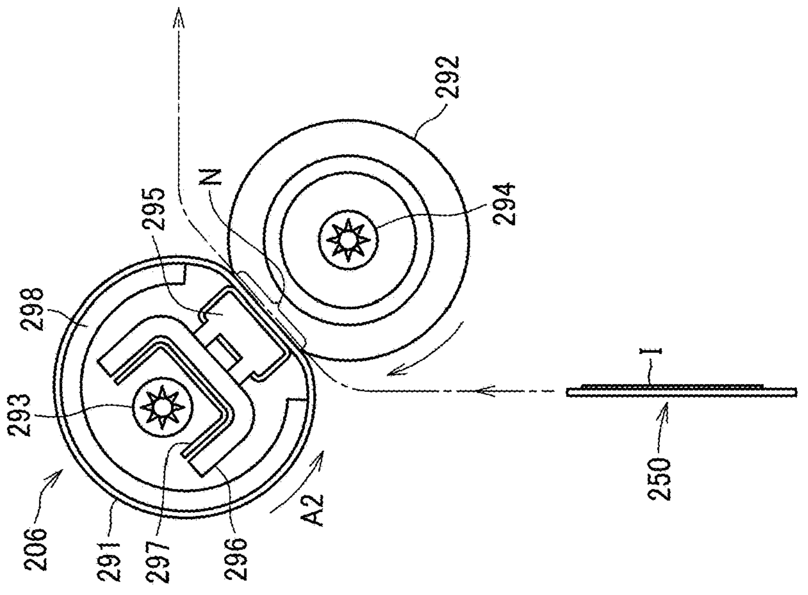
FIG. 23 is a schematic cross-sectional view of the drying device of FIG. 22.

As illustrated in FIG. 23, the drying device 206 includes a heating belt 291 as the belt, a heating roller 292 as the pressure rotator, a first heater 293 as the heat source that heats the heating belt 291, a second heater 294 as the heat source that heats the heating roller 292, a nip formation pad 295, a stay 296 as the support, a reflector 297, and belt holders 298 as belt holders that hold the heating belt 291 such that the heating belt 291 can rotate. The nip formation pad 295 includes a slide aid sheet as the slide aid.

The nip formation pad 295 contacts an outer peripheral surface of the heating roller 292 via the heating belt 291 to form a nip N between the heating belt 291 and the heating roller 292. As illustrated in FIG. 23, when a sheet 250 bearing an image formed by the ink I is conveyed to the nip N of the drying device 206, the sheet 250 is heated while being conveyed by the heating belt 291 and the heating roller 292 rotating in the directions indicated by arrows in FIG. 23. Thus, the drying of the ink I on the sheet 250 is accelerated.

The drying device 206 illustrated in FIG. 23 includes the lubricant held between the heating belt 291 and a slide aid sheet of the nip formation pad 295 and between the heating belt 291 and the belt holders 298. Accordingly, applying the present embodiments of the present disclosure to the above-described drying device 206 can also prevent the deviation of the lubricant in the longitudinal direction similar to the above-described embodiments.

The above-described embodiments are illustrative and do not limit this disclosure. It is therefore to be understood that within the scope of the appended claims, numerous additional modifications and variations are possible to this disclosure otherwise than as specifically described herein.

The sheet is one example of a recording medium. The recording medium may be a sheet of plain paper, thick paper, thin paper, a postcard, an envelope, coated paper, art paper, tracing paper, overhead projector (OHP) sheet, plastic film, prepreg, copper foil, or the like.

In the above description, the controller controls the motor to rotate in the reverse direction based on the temperature of the belt as the reference temperature for the reverse rotation operation of the belt. However, the controller may determine the execution of the reverse rotation operation of the belt based on the temperature of another member in the heating device as long as the temperature of said another member corresponds to the temperature of the belt.

Further, the directions of the mesh or the grooves formed on the slide face of the slide aid are not limited to the directions illustrated in FIG. 4, and any configuration may be employed as long as the lubricant is biased in the longitudinal direction by the rotation of the belt in the forward direction. In this case, the reverse rotation of the belt can prevent the deviation of the lubricant in the longitudinal direction.

Aspects of the present disclosure are, for example, as follows.

First Aspect

In a first aspect, an image forming apparatus includes a heating device, a motor, and circuitry. The heating device includes a belt, a heater, belt holders, a slide aid, lubricant, and a temperature sensor. The heater heats the belt. The belt holders hold both ends of the belt in a longitudinal direction of the belt. The inner circumferential surface of the belt slides on the slide aid. The lubricant is adhered to the belt. The temperature sensor detects a temperature of the belt. The motor rotates the belt in a forward direction to convey a recording medium and a reverse direction opposite to the forward direction. The circuitry is configured to control the motor to rotate the belt in the reverse direction in response to a detection of the temperature equal to or higher than 50° C. by the temperature sensor.

Second Aspect

In a second aspect, the circuitry in the image forming apparatus according to the first aspect is further configured to control the motor to rotate the belt in the reverse direction in response to a detection of the temperature equal to or higher than 100° C. by the temperature sensor.

Third Aspect

In a third aspect, the circuitry in the image forming apparatus according to the first aspect or the second aspect is further configured to control the motor to rotate the belt in the reverse direction in response to a detection of the temperature equal to or lower than 205° C. by the temperature sensor.

Fourth Aspect

In a fourth aspect, the circuitry in the image forming apparatus according to the first aspect or the second aspect is further configured to control the motor to rotate the belt in the reverse direction in response to a detection of the temperature equal to or lower than 200° C. by the temperature sensor.

Fifth Aspect

In a fifth aspect, the circuitry in the image forming apparatus according to the first aspect or the second aspect is further configured to control the motor to rotate the belt in the reverse direction in response to a detection of the temperature equal to or lower than 185° C. by the temperature sensor.

Sixth Aspect

In a sixth aspect, the circuitry in the image forming apparatus according to any one of the first to fifth aspects is further configured to control the motor to rotate the belt in the reverse direction based on at least one of an accumulating travel distance of the belt or an accumulating number of recording media passing through the heating device to be heated.

Seventh Aspect

In a seventh aspect, the circuitry in the image forming apparatus according to any one of the first to sixth aspects is further configured to control the motor to rotate the belt in the reverse direction before or after a recording medium on which an image is formed passes through the heating device.

Eighth Aspect

In an eighth aspect, the circuitry in the image forming apparatus according to any one of the first to seventh aspects is further configured to execute an adjustment operation of the image forming apparatus and control the motor to rotate the belt in the reverse direction before or after the recording medium on which the image is formed passes through the heating device.

Ninth Aspect

In a ninth aspect, the circuitry in the image forming apparatus according to any one of the first to eighth aspects is further configured to execute a temperature adjustment operation of the belt and control the motor to rotate the belt in the reverse direction before or after the recording medium on which the image is formed passes through the heating device.

Tenth Aspect

In a tenth aspect, the slide aid in the image forming apparatus according to any one of the first to ninth aspects includes a first mesh and a second mesh. The first mesh extends in a first direction inclined to the forward direction from one end to a center of the slide aid in the longitudinal direction of the belt. The second mesh extends in a second direction different from the first direction, and the second direction is inclined to the forward direction from another end to the center of the slide aid in the longitudinal direction of the belt.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

a heating device including:

a belt;

a heater to heat the belt;

belt holders to hold both ends of the belt in a longitudinal direction of the belt;

a slide aid on which an inner circumferential surface of the belt slides;

lubricant adhered to the belt; and a temperature sensor to detect a temperature of the belt;

a motor to rotate the belt, in a forward direction to convey a recording medium; and a reverse direction opposite to the forward direction; and circuitry configured to control the motor to rotate the belt in the reverse direction in response to a viscosity of the lubricant being equal to or less than a predetermined value that is equal to or smaller than 70 centistokes (CS).

2. The image forming apparatus according to claim 1, wherein:

the circuitry is further configured to control the motor to rotate the belt in the reverse direction in response to a detection of the temperature equal to or higher than 100° C. by the temperature sensor.

3. The image forming apparatus according to claim 2, wherein:

the circuitry is further configured to control the motor to rotate the belt in the reverse direction in response to a detection of the temperature equal to or lower than 205° C. by the temperature sensor.

4. The image forming apparatus according to claim 2, wherein:

the circuitry is further configured to control the motor to rotate the belt in the reverse direction in response to a detection of the temperature equal to or lower than 200° C. by the temperature sensor.

5. The image forming apparatus according to claim 2, wherein:

the circuitry is further configured to control the motor to rotate the belt in the reverse direction in response to a detection of the temperature equal to or lower than 185° C. by the temperature sensor.

6. The image forming apparatus according to claim 1, wherein:

the circuitry is further configured to control the motor to rotate the belt in the reverse direction based on at least one of:

an accumulating travel distance of the belt; or an accumulating number of recording media passing through the heating device to be heated.

7. The image forming apparatus according to claim 1, wherein:

the circuitry is configured to control the motor to rotate the belt in the reverse direction before or after a recording medium on which an image is formed passes through the heating device.

8. The image forming apparatus according to claim 7, wherein:

the circuitry is configured to execute an adjustment operation of the image forming apparatus and control the motor to rotate the belt in the reverse direction before or after a recording medium on which an image is formed passes through the heating device.

9. The image forming apparatus according to claim 7, wherein:

the circuitry is configured to execute a temperature adjustment operation of the belt and control the motor to rotate the belt in the reverse direction before or after a recording medium on which an image is formed passes through the heating device.

10. The image forming apparatus according to claim 1, wherein the slide aid includes:

a first mesh extending in a first direction inclined to the forward direction from one end to a center of the slide aid in the longitudinal direction of the belt; and a second mesh extending in a second direction different from the first direction, the second direction inclined to the forward direction from another end to the center of the slide aid in the longitudinal direction of the belt.

11. An image forming apparatus comprising:

a heating device including:

a belt;

a heater to heat the belt;

belt holders to hold both ends of the belt in a longitudinal direction of the belt;

a slide aid including a first mesh and a second mesh on which an inner circumferential surface of the belt slides, the first mesh extending in a first direction and the second mesh extending in a second direction different from the first direction;

lubricant adhered to the belt; and a temperature sensor to detect a temperature of the belt;

a motor to rotate the belt, in a forward direction to convey a recording medium, and a reverse direction opposite to the forward direction; and circuitry configured to control the motor to rotate the belt at least two rotations in the reverse direction in response to a viscosity of the lubricant being equal to or less than a predetermined value that is equal to or smaller than 70 centistokes (CS).

12. The image forming apparatus according to claim 11, wherein:

the heater to heat the belt including the slide aid including the first mesh and the second mesh on which the inner circumferential surface of the belt slides.

13. The image forming apparatus according to claim 11, wherein:

the first mesh and the second mesh of the slide aid move the lubricant toward a center of the belt when the motor rotates the belt in the forward direction, and the first mesh and the second mesh of the slide aid move the lubricant toward both the ends of the belt when the motor rotates the belt in the reverse direction.

14. The image forming apparatus according to claim 11, wherein:

the motor rotates the belt in the reverse direction the at least two rotations during a warm-up period.

15. The image forming apparatus according to claim 11, wherein:

the motor rotates the belt in the reverse direction the at least two rotations to adjust the temperature of the belt before or after the recording medium is conveyed.

16. The image forming apparatus according to claim 11, wherein:

the motor rotates the belt in the reverse direction the at least two rotations while the image forming apparatus performs an adjustment operation.

17. The image forming apparatus according to claim 11, wherein the slide aid includes:

the first mesh extending in the first direction inclined to the forward direction from one end to a center of the slide aid in the longitudinal direction of the belt; and the second mesh extending in the second direction different from the first direction, the second direction inclined to the forward direction from another end to the center of the slide aid in the longitudinal direction of the belt.

18. The image forming apparatus according to claim 11, wherein each of the belt holders comprises:

an insertion portion inserted into each of the ends of the belt in the longitudinal direction of the belt, a restraint, and a fixed portion.

* * * * *